(12) United States Patent
Liu et al.

(10) Patent No.: US 10,632,430 B1
(45) Date of Patent: Apr. 28, 2020

(54) SYSTEMS AND METHODS FOR MIXING EXHAUST GASES AND REDUCTANT IN AN AFTERTREATMENT SYSTEM

(71) Applicant: Cummins Emission Solutions Inc., Columbus, IN (US)

(72) Inventors: Z. Gerald Liu, Madison, WI (US); Apoorv Kalyankar, Madison, WI (US); Achuth Munnannur, Verona, WI (US); Niklas M. Schmidt, Madison, WI (US); David Lee Dunnuck, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 16/442,014

(22) Filed: Jun. 14, 2019

(51) Int. Cl.
| | |
|---|---|
| *B01F 5/00* | (2006.01) |
| *F01N 3/20* | (2006.01) |
| *B01D 53/94* | (2006.01) |
| *B01F 5/04* | (2006.01) |
| *B01F 3/04* | (2006.01) |
| *F01N 9/00* | (2006.01) |

(52) U.S. Cl.
CPC ........ *B01F 5/0065* (2013.01); *B01D 53/9431* (2013.01); *B01F 3/04049* (2013.01); *B01F 5/0415* (2013.01); *F01N 3/2066* (2013.01); *F01N 3/208* (2013.01); *F01N 9/007* (2013.01); *F01N 2570/14* (2013.01); *F01N 2610/02* (2013.01); *F01N 2610/14* (2013.01)

(58) Field of Classification Search
CPC . B01D 53/9431; B01D 5/0065; F01N 3/2065; F01N 3/208; F01N 9/007; B01F 5/0065

USPC .................................. 422/168, 176; 60/274
See application file for complete search history.

(56) References Cited

U.S. PATENT DOCUMENTS

| | | |
|---|---|---|
| 4,424,777 A | 1/1984 | Klomp |
| 7,581,387 B2 | 9/2009 | Bui et al. |
| 8,615,984 B2 | 12/2013 | Kornherr et al. |
| 9,248,404 B2 | 2/2016 | Brunel et al. |
| 9,346,017 B2 | 5/2016 | Greber |

(Continued)

FOREIGN PATENT DOCUMENTS

WO    WO-2018/226626 A1    12/2018

OTHER PUBLICATIONS

International Search Report from corresponding PCT Application No. PCT/US2018/035959, dated Oct. 19, 2018, pp. 1-4.

(Continued)

*Primary Examiner* — Tom P Duong
(74) *Attorney, Agent, or Firm* — Foley & Lardner LLP

(57) ABSTRACT

A vane swirl mixer for exhaust aftertreatment includes: a vane swirl mixer inlet; a vane swirl mixer outlet; a first flow device including: a Venturi body; a plurality of upstream vanes positioned within the Venturi body; a plurality of upstream vane apertures interspaced between the plurality of upstream vanes; a plurality of downstream vanes positioned within the Venturi body; and a plurality of downstream vane apertures interspaced between the plurality of downstream vanes. At least one of the upstream vane hub and the downstream vane hub is radially offset from a Venturi center axis, thereby causing individual ones of the plurality of vanes coupled to the radially offset vane hub to differ in their geometry.

20 Claims, 9 Drawing Sheets

(56) References Cited

U.S. PATENT DOCUMENTS

| | | |
|---|---|---|
| 9,453,444 B2 | 9/2016 | Fischer et al. |
| 2005/0262843 A1* | 12/2005 | Monty ...................... F23R 3/14 |
| | | 60/748 |
| 2006/0191254 A1 | 8/2006 | Bui et al. |
| 2009/0000283 A1* | 1/2009 | Endicott ............. F02B 29/0468 |
| | | 60/309 |
| 2009/0019843 A1* | 1/2009 | Levin .................. B01F 3/04049 |
| | | 60/303 |
| 2010/0251719 A1* | 10/2010 | Mancini .................... F23R 3/14 |
| | | 60/737 |
| 2011/0005232 A1 | 1/2011 | Williams et al. |
| 2012/0204541 A1 | 8/2012 | Li et al. |
| 2012/0204544 A1* | 8/2012 | Uhrich .................. F01N 3/0807 |
| | | 60/274 |
| 2013/0333363 A1 | 12/2013 | Joshi et al. |
| 2015/0016214 A1 | 1/2015 | Mueller |
| 2016/0090887 A1 | 3/2016 | Mitchell et al. |
| 2016/0138454 A1 | 5/2016 | Alano et al. |
| 2016/0158714 A1 | 6/2016 | Li et al. |
| 2017/0067387 A1* | 3/2017 | Khaled ................. F01N 3/2066 |
| 2017/0107882 A1* | 4/2017 | Chiruta ................ F01N 3/2066 |
| 2017/0152778 A1 | 6/2017 | Li et al. |
| 2018/0266300 A1* | 9/2018 | Liu ....................... F01N 3/2892 |

OTHER PUBLICATIONS

Written Opinion from corresponding PCT Application No. PCT/US2018/035959, dated Oct. 19, 2018, pp. 1-8.

* cited by examiner

SYSTEMS AND METHODS FOR MIXING EXHAUST GASES AND REDUCTANT IN AN AFTERTREATMENT SYSTEM

TECHNICAL FIELD

The present application relates generally to the field of aftertreatment systems for internal combustion engines, and more particularly to a vane swirl mixer used in such aftertreatment systems.

BACKGROUND

For internal combustion engines, such as diesel engines, nitrogen oxide (NOx) compounds may be emitted in the exhaust. To reduce NOx emissions, a selective catalytic reduction (SCR) process may be implemented to convert the NOx compounds into more neutral compounds, such as diatomic nitrogen or water, with the aid of a catalyst and a reductant. The catalyst may be included in a catalyst chamber of an exhaust system, such as that of a vehicle or power generation unit. A reductant, such as anhydrous ammonia, aqueous ammonia, diesel exhaust fluid (DEF), or aqueous urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

Once the reductant is introduced into the exhaust gas flow, the two need to be mixed. WO 2018/226626 A1 discloses a multi-stage mixer which is configured to receive exhaust gas and reductant and mix the reductant with the exhaust gas to provide the exhaust gas mixed with reductant to a catalyst. The application recognizes that it is beneficial to provide the catalyst with a substantially uniform flow of exhaust gases and reductant, facilitate substantially uniform reductant distribution in the exhaust gases downstream the multi-stage mixer and provide a relatively low pressure drop in a relatively compact space compared to conventional aftertreatment systems. The known multi-stage mixer uses a Venturi to introduce a swirl mix into the exhaust flow and uses a radial offset of that Venturi from the center axis of the multi-stage mixer so as to cause any reductant build up on the Venturi body to be substantially redistributed to the exhaust gases downstream of the multi-stage mixer.

However, the known multi-stage mixer, while a significant improvement over the prior art, is not proportionally scalable over the complete range of diesel engine systems due to restrictions on space claim. Thus, so as to allow better scaling while still causing any reductant build up on the Venturi body to be substantially redistributed to the exhaust gases downstream of the mixer, an improved mixer would be desirable.

SUMMARY

In an embodiment a vane swirl mixer for exhaust aftertreatment is centered on a mixer center axis and comprises a vane swirl mixer inlet, a vane swirl mixer outlet, a first flow device and a Venturi body. The vane swirl mixer inlet is configured to receive exhaust gas. The vane swirl mixer outlet is configured to provide the exhaust gas to a catalyst. The first flow device is configured to receive the exhaust gas from the vane swirl mixer inlet and to receive a reductant such that the reductant is mixed with the exhaust gas within the first flow device. The first flow device includes a Venturi body defined by a body inlet in fluid communication with the vane swirl mixer inlet and a body outlet in fluid communication with the vane swirl mixer outlet. The Venturi body comprises a Venturi center axis. A plurality of upstream vanes is positioned within the Venturi body and proximate the body inlet, wherein each of the upstream vanes is coupled to an upstream vane hub. A plurality of upstream vane apertures is interspaced between the plurality of upstream vanes. The plurality of upstream vane apertures is configured to receive the exhaust gas and to cooperate with the plurality of upstream vanes to provide the exhaust gas with a swirl flow that facilitates mixing of the reductant and the exhaust gas. A plurality of downstream vanes is positioned within the Venturi body and proximate the body outlet, wherein each of the downstream vanes is coupled to a downstream vane hub. The plurality of downstream vane apertures is interspaced between the plurality of downstream vanes and the plurality of downstream vane apertures is configured to receive the exhaust gas and cooperate with the plurality of downstream vanes to facilitate mixing of the reductant and the exhaust gas.

At least one of the upstream vane hub and the downstream vane hub is radially offset from the Venturi center axis, causing individual ones of the plurality of upstream vanes to differ in their geometry and/or individual ones of the plurality of downstream vanes to differ in their geometry, as the case may be.

In this embodiment, the offset of the mixer vanes and thereby the variably geometry effectively redistributes the reductant within the swirl flow. At the same time the other components can be centered on the main axis of the vane swirl mixer allowing for concentric parts that are easier to scale and manufacture for various sizes of engines and exhaust systems.

The downstream vane hub may not be radially offset from the Venturi center axis. An alternative definition of this arrangement is that the downstream vane hub is centered on the Venturi center axis.

This embodiment enables the vane swirl mixer to effectively mix the reductant and the exhaust gas within the first flow device while enabling a more centered stream of exhaust gas downstream of the downstream vanes and thus allowing for a better efficiency of the catalyst.

Each of the plurality of upstream vanes can be defined by an upstream vane angle between an upstream vane hub center axis of the upstream vane hub and the plane of the upstream vane. The upstream vane hub center axis may be parallel to the Venturi center axis. The upstream vane angle for each of the plurality of upstream vanes may be between forty-five degrees and ninety degrees and the upstream vane angle for one of the plurality of upstream vanes may be different from the upstream vane angle for another of the plurality of upstream vanes.

Each of the plurality of downstream vanes can be defined by a downstream vane angle between a downstream vane hub center axis of the downstream vane hub and the plane of the downstream vane. The downstream vane hub center axis may be parallel to the Venturi center axis. The downstream vane angle for each of the plurality of downstream vanes may be between forty-five degrees and ninety degrees and the downstream vane angle for one of the plurality of downstream vanes may be different from the downstream vane angle for another of the plurality of downstream vanes.

Optionally each of the plurality of upstream vanes and/or the plurality of downstream vanes is coupled to and conforms with the Venturi body.

The plurality of upstream vanes and the plurality of downstream vanes can be conduit straight vanes. Adjacent conduit straight vanes then form a conduit therebetween. The conduit has a streamwise direction that is defined by the angle bisector of the planes of the adjacent conduit straight vanes. A streamwise angle is defined between the plane of the conduit straight vane and a hub center axis of the conduit straight vane hub. The hub center axis of the conduit straight vane hub is parallel to the Venturi center axis. The streamwise angle for each of the plurality of conduit straight vanes may be between thirty degrees and ninety degrees, inclusive, and the streamwise angle for one of the plurality of conduit straight vanes may differ from the streamwise angle for another of the plurality of conduit straight vanes.

If a vane, be it an upstream vane or a downstream vane, is not a straight vane but has at least one of a twist in the radial direction and a curvature in the circumferential direction, then the plane of said vane is determined by using at least one of an appropriate secant as a reference.

Secants appropriate for the twist are to be drawn from the end of the vane at the hub to the radially outer end, at each of the leading and the trailing edge of the vane. These are then projected in the circumferential direction onto the radius at half the circumferential length of said vane so as to determine the angle bisector of these two projected secants. The angle bisector is then again projected in the circumferential direction, back to the leading and the trailing edge. The plane defined by the two projected angle bisectors is used as the reference.

Secants appropriate for the curvature are to be drawn from the leading edge to the trailing edge at both, the end of the vane at the hub and the radially outer end. The plane defined by these two secants is used as the reference.

Each of the plurality of conduit straight vanes can be coupled to and conform with the Venturi body such that each of the plurality of conduit straight vanes cooperates with the Venturi body to form a conduit.

One of the plurality of conduit straight vanes can extend over another of the plurality of conduit straight vanes over an extension distance. The one of the plurality of conduit straight vanes has a width in the streamwise direction. The extension distance may be between zero and seventy-five percent of the width in the streamwise direction of the one of the plurality of conduit straight vanes.

The Venturi body can comprise an exhaust gas guide aperture disposed along the Venturi body between the body inlet and the body outlet.

The exhaust gas guide aperture can be circular, alternatively elliptical. The elliptical guide aperture can be dimensioned to have the same area of opening as the circular exhaust gas guide aperture while allowing for the Venturi body to require less length in the axial direction of the mixer center axis and reducing the space between an upstream mixer and a downstream mixer. Reducing the spacing between the mixers increases available volume between the downstream mixer and an SCR inlet, promotes a better decomposition and mixing of the reductant and improves the efficiency of the SCR system to reduce NOx emissions.

The vane swirl mixer can comprise a reductant doser through which the reductant is introduced into the vane swirl mixer. The doser may be located about the exhaust gas guide aperture. If the latter is the case, the doser and the exhaust gas guide aperture are placed on a vertical mid-plane of the vane swirl mixer, directing the reductant towards the mixer center axis. Alternatively the doser and the exhaust gas guide aperture are placed at an offset of a vertical mid-plane of the vane swirl mixer, directing the reductant towards the Venturi walls. This offset may correlate with an offset of the vane hub of the upstream mixer and/or the downstream mixer. If the doser is not located about the exhaust gas guide aperture, only the doser may be placed on a vertical mid-plane of the vane swirl mixer, directing the reductant towards the mixer center axis, or alternatively placed at an offset of a vertical mid-plane of the vane swirl mixer, directing the reductant towards the Venturi walls. The offset may again correlate with an offset of the vane hubs of the upstream and/or the downstream mixers.

In one embodiment the Venturi center axis is radially offset from the mixer center axis. Alternatively, and as also described below and shown in the accompanying drawings, the Venturi center axis is centered on the mixer center axis.

The vane swirl mixer may be part of a multi-stage mixer such as it is shown in WO 2018/226626 A1.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
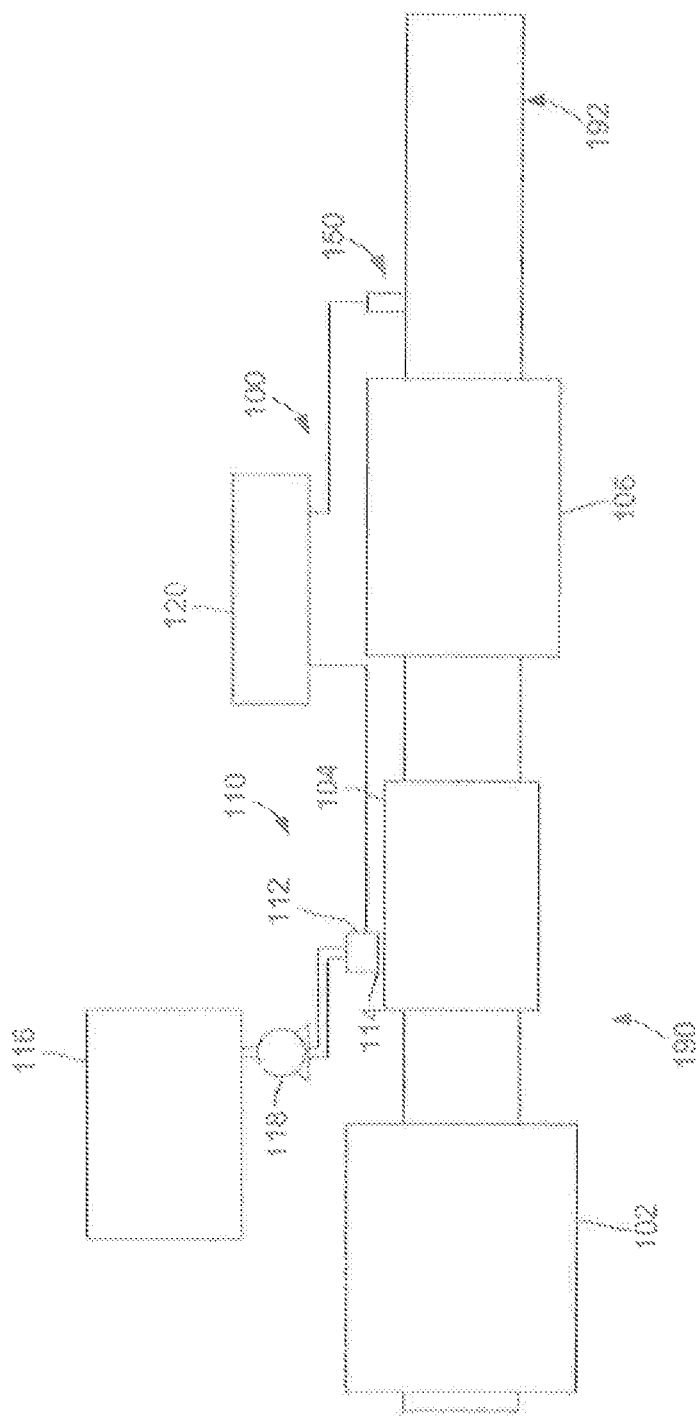
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for flow distribution in an aftertreatment system. The various concepts introduced above and discussed in greater detail below may be implemented in any of numerous ways, as the described concepts are not limited to any particular manner of implementation. Examples of specific implementations and applications are provided primarily for illustrative purposes.

I. OVERVIEW

Internal combustion engines (e.g., diesel internal combustion engines, etc.) produce exhaust gases that are often treated within an aftertreatment system. This treatment often includes passing the exhaust gases through a catalyst. By providing the catalyst with a uniform flow of the exhaust gases, the efficiency of the catalyst, and therefore of the aftertreatment system, may be increased. Various components, such as baffles, may be included within an aftertreatment system to change the flow of the exhaust gases into the catalyst. Conventional aftertreatment systems implement components that are difficult to scale (e.g., for different applications, etc.) in a radial direction (e.g., various diameters, etc.) and in an axial direction (e.g., various lengths, various numbers of components, various configurations of components, etc.). For example, baffles may have complicated shapes that require advanced manufacturing techniques, and therefore substantial cost, to produce. As a result, conventional aftertreatment systems do not offer the flexibility necessary to be easily implemented in applications with varying engine ratings and/or operating conditions. Further, conventional aftertreatment systems typically utilize complicated components that are expensive and require difficult and time intensive manufacturing.

Implementations described herein relate to a vane swirl mixer that includes a plurality of flow devices that cooperate to provide a catalyst with a substantially uniform flow of exhaust gases and reductant, facilitate substantially uniform reductant distribution in the exhaust gases downstream of the multi-stage mixer, and provide a relatively low pressure drop (e.g., the pressure of the exhaust gases at the inlet of the multi-stage mixer less the pressure of the exhaust gases at the outlet of the multi-stage mixer, etc.), all in a relatively compact space, compared to conventional aftertreatment systems. The flow devices are relatively easy to manufacture compared to the complicated devices currently used in aftertreatment systems. As a result, the vane swirl mixer can be easily and readily scaled for various applications while consuming less physical space than devices currently used in aftertreatment systems. The multi-stage mixer may be configured to dose the exhaust gases with reductant, to cause an internal swirl flow that mixes the reductant within the exhaust gases, and to create a uniform distribution of the reductant within the uniform flow of the exhaust gases that flows into the catalyst. The vane swirl mixer may minimize spray impingement on wall surfaces due to swirl flow and relatively high shear stresses produced on the walls by the vane swirl mixer, thereby mitigating deposit formation and accumulation within the vane swirl mixer and associated exhaust components.

In some implementations, the vane swirl mixer includes an exhaust gas guide that directs exhaust gases towards reductant ejected from a reductant guide. The exhaust gases flow into the exhaust gas guide via apertures that are disposed on at least part of the exhaust gas guide. The exhaust gases then assist the reductant in traveling into a flow device whereby the reductant and the exhaust gases may be subsequently mixed via a swirl flow. The mixing may improve decomposition by utilizing the low pressure created by swirl flow and/or Venturi flow, enhance ordinary and turbulent diffusion, and elongate a mixing trajectory of the exhaust gases and the reductant. Swirl flow refers to flow that swirls about a center axis of the vane swirl mixer and/or a center axis of a flow device. Venturi flow refers to flow which occurs due to a low pressure region resulting from a reduction of cross-sectional area and a local flow acceleration.

In some implementations, a flow device of the vane swirl mixer includes internal plates that are positioned under the reductant guide. As the reductant flows into the flow device, the reductant contacts the internal plates which facilitate mixing of the reductant within the exhaust gases by reducing the Stokes number of the reductant (e.g., reductant droplets, etc.) via splashing.

The design features of the vane swirl mixer can be optimized to cater to a wide range of length to diameter ratio of the mixer (L/D) thus enabling both isotropic and anisotropic geometry scaling of the mixer design. The features may be combined to design a mixer with a bigger Venturi diameter while achieving the same flow profile.

II. OVERVIEW OF AFTERTREATMENT SYSTEM

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber or reactor 104, a SCR catalyst 106, and a sensor 150. In some embodiments, the SCR catalyst 106 includes an ammonia oxidation catalyst (ASC).

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or DEF, into ammonia. The decomposition chamber 104 includes a reductant delivery system 110 having a doser or dosing module 112 configured to dose the reductant into the decomposition chamber 104 (for example, via an injector such as the injector described below). In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing NOx emissions and an outlet for the exhaust gas, NOx emissions, ammonia, and/or reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 on which the dosing module 112 is mounted. The dosing module 112 is fluidly coupled to one or more reductant sources 116. In some implementations, a pump 118 may be used to pressurize the reductant from the reductant sources 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR catalyst 106 is configured to assist in the reduction of NOx emissions by accelerating a NOx reduction process between the ammonia and the NOx of the exhaust gas into diatomic nitrogen and water. The SCR catalyst 106 includes an inlet in fluid communication with the decomposition chamber 104 from which exhaust gas and reductant are received and an outlet in fluid communication with an end of the exhaust system 190.

The exhaust system 190 may further include an oxidation catalyst (for example a diesel oxidation catalyst (DOC)) in fluid communication with the exhaust system 190 (e.g., upstream of the SCR catalyst 106 or the DPF 102) to oxidize hydrocarbons and carbon monoxide in the exhaust gas.

In some implementations, the DPF 102 may be positioned downstream of the decomposition chamber or reactor 104. For instance, the DPF 102 and the SCR catalyst 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190.

III. EXAMPLE VANE SWIRL MIXER

Figure 2:
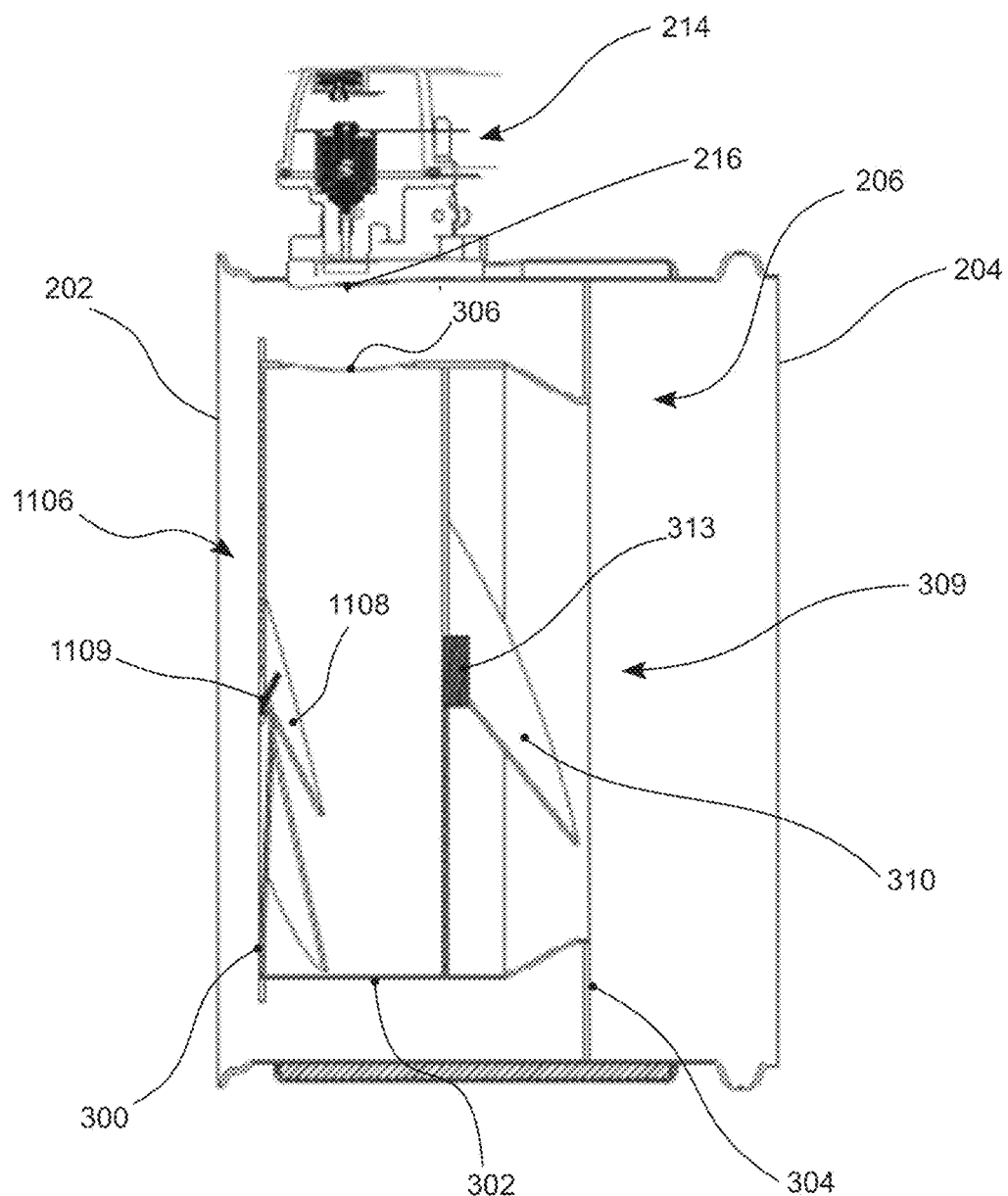
FIG. 2 is a cross-sectional view of a vane swirl mixer and a doser.

FIG. 2 depicts a vane swirl mixer 200 according to an example embodiment. While a vane swirl mixer 200 is described in this particular embodiment, it is understood that the relevant structure in this and similar embodiments may constitute other aftertreatment components such as a SCR catalyst, a perforated tube, a pipe, a manifold, a decomposition chamber or reactor, a doser, a dosing module, and others. The vane swirl mixer 200 is configured to receive exhaust gases (e.g., combustion gases from an internal combustion engine, etc.) and to provide the exhaust gases downstream with a substantially uniform flow distribution (e.g., flow profile, etc.). According to an example embodiment, the vane swirl mixer 200 is additionally configured to selectively dose the exhaust gases with a reductant (e.g., urea, diesel exhaust fluid (DEF), AdBlue®, etc.). Because the vane swirl mixer 200 provides a substantially uniform flow distribution of the exhaust gases and promotes mixing between exhaust gases and reductant, the vane swirl mixer 200 may also provide the exhaust gases downstream with a substantially uniform reductant distribution (e.g., reductant profile, etc.).

The vane swirl mixer 200 includes a vane swirl mixer inlet 202 that receives the exhaust gases into the vane swirl mixer 200 and a vane swirl mixer outlet 204 that provides the exhaust gases from the vane swirl mixer 200. According to various embodiments, the vane swirl mixer inlet 202 receives the exhaust gases from a diesel particulate filter (e.g., the DPF 102, etc.) and the vane swirl mixer outlet 204 provides the exhaust gases to the SCR catalyst 106.

Flows of fluid can be defined by a Reynolds number, which is related to a flow pattern of the fluid, and a Stokes number, which is related to the behavior of particles suspended within the fluid. Depending on the Reynolds number, the flow may be, for example, turbulent or laminar. The flow of the exhaust gases into the vane swirl mixer inlet 202 can be defined by a Reynolds number that is greater than $1e^4$, indicating that the flow of the exhaust gases is turbulent. Because the flow of the exhaust gases into the vane swirl mixer inlet 202 is turbulent, self-similarity exists. Depending on the Stokes number, particles may be more or less likely to follow the flow of fluid. The flow of reductant can be defined by a Stokes number that is on the order of one indicating that the reductant is unlikely to follow the flow of exhaust gases which poses a problem in conventional mixing devices. Advantageously, the vane swirl mixer 200 incorporates various components and devices herein which cause the reductant to be mixed with the exhaust gases (e.g., by reducing the Stokes number of the reductant, etc.) such that the reductant is propelled through the vane swirl mixer 200 along with the exhaust gases. In this way, the vane swirl mixer 200 improves reductant mixing and reduces a risk associated with formation of deposits within the vane swirl mixer 200. In various embodiments, the vane swirl mixer 200 is static and does not have components which move in response to the passage of exhaust gases through the vane swirl mixer 200. In this way, the vane swirl mixer 200 may be less complex to manufacture and less expensive, and therefore more desirable, than aftertreatment components with moving components.

The vane swirl mixer 200 includes a plurality of flow devices that segment the vane swirl mixer 200 into a plurality of stages. Each of the plurality of flow devices is structured to alter the flow of the exhaust gases and reductant so that the plurality of flow devices cumulatively causes the exhaust gases to obtain a target flow distribution and the reductant to obtain a target uniformity index (e.g., uniformity distribution, etc.) at the vane swirl mixer outlet 204. Obtaining certain flow distributions and reductant uniformities indices is important in the operation of an aftertreatment system. For example, it is desirable to obtain a uniform flow distribution and reductant uniformity index at an inlet of an SCR catalyst because such a flow distribution allows the SCR catalyst to obtain a relatively high conversion efficiency.

As shown in FIG. 2, the vane swirl mixer 200 includes a first flow device 206.

The vane swirl mixer 200 includes a doser 214 and a port 216 through which reductant (e.g., reductant droplets, etc.) from the doser 214 is selectively introduced into the vane swirl mixer 200. The vane swirl mixer 200 distributes the reductant uniformly within the exhaust gases that flow from the vane swirl mixer outlet 204 of the vane swirl mixer 200. The port 216 is configured to guide, or assist in guiding, the reductant towards a center (e.g., a center axis, center of domain, etc.) of the vane swirl mixer 200 regardless of the conditions (e.g., flow rate, temperature, etc.) of the exhaust gases. For example, the port 216 may have various shapes and/or thicknesses in order to guide the reductant towards the center of the multi-stage mixer 200. Alternatively the port 216 can be configured to guide, or assist in guiding, the reductant offset from the center (e.g., a center axis, center of domain, etc.) of the vane swirl mixer. For example, the port 216 may be offset from the center axis of the vane swirl mixer to direct the flow of reductant towards the sidewall of the first flow device.

In some embodiments, the vane swirl mixer 200 also includes a reductant guide (e.g., nozzle, perforated tube, etc.) that at least partially shields the reductant from the flow of the exhaust gases from the vane swirl mixer inlet 202 to facilitate guiding of the reductant to the center of the vane swirl mixer 200. The reductant guide extends from the port 216, receives the reductant from the doser 214, and provides the reductant into the vane swirl mixer 200 (e.g., at a center of the vane swirl mixer 200, etc.). In various embodiments, the reductant guide is frustoconical.

Due to the specific configuration and construction of the vane swirl mixer 200, the vane swirl mixer 200 is scalable and easily configurable while maintaining the ability to provide exhaust gases having a highly uniform flow and reductant profile while minimizing a pressure drop experienced by the exhaust gases as well as minimizing the likelihood of deposit (e.g., urea deposit, etc.) formation. As a result, the vane swirl mixer 200 is capable of being configured for a target application at a lower cost than other mixers which are not readily adaptable (i.e., due to the scalability and modularity of the vane swirl mixer 200, etc.). The vane swirl mixer 200 and components thereof are scalable in the axial direction (e.g., in length, etc.) and the radial direction (e.g., in diameter, etc.).

By being scalable, the vane swirl mixer 200 can be utilized in various applications where different lengths and/or diameters of the vane swirl mixer 200 are desired. For example, the vane swirl mixer may be produced for use with an aftertreatment system of a maritime vessel in one size and produced for use with an aftertreatment system of a diesel commercial vehicle in another size.

Because of the flexibility of the vane swirl mixer 200, the vane swirl mixer 200 is capable of being manufactured at a lower cost than conventional aftertreatment devices and of being easily tailored to many specific applications, thereby making the vane swirl mixer 200 more desirable than conventional aftertreatment devices. Further, the vane swirl mixer 200 may be configured for retrofit or drop-in applications.

The first flow device 206 is shown to include a funneling edge 300, a Venturi body 302, and a first support flange 304 (e.g., downstream support flange, etc.). The funneling edge 300 is contiguous with the Venturi body 302 which is contiguous with the first support flange 304. The funneling edge 300 is configured to direct a majority of the exhaust gases from the vane swirl mixer inlet 202 into the Venturi body 302. However, the funneling edge 300 permits a portion of the exhaust gases to initially circumvent the Venturi body 302 and enter a region between the first flow device 206 and the vane swirl mixer 200. The funneling edge 300 may have various angles relative to the center axis of the vane swirl mixer 200 (e.g., ninety degrees, forty-five degrees, thirty degrees, fifteen degrees, etc.). Additionally, the funneling edge 300 may have various heights, as will be explained in more detail herein, relative to an outer edge of the body (e.g., relative to an outer diameter of the body, etc.). By adjusting the height of the funneling edge 300, more or less of the exhaust gases can be directed into the first flow device 206 and more or less of the exhaust gases can be directed around the first flow device 206 (e.g., in a circumvented flow, etc.).

The Venturi body 302 may be circular, conical, frusto-conical, aerodynamic, or other similar shapes. The first support flange 304 functions to couple the first flow device 206 to the vane swirl mixer 200. In various embodiments, the first support flange 304 provides a seal between the Venturi body 302 and the vane swirl mixer 200 such that no exhaust gases may pass through or circumvent the first support flange 304. As a result, the exhaust gases are redirected from the first support flange 304 upstream for entry into the Venturi body 302. However, as explained in more detail herein, the first support flange 304 in some embodiments has apertures through which the exhaust gases may pass to pass through the first flow device 206.

According to various embodiments, the diameter of the Venturi body 302 is:

$$0.25 D_0 \leq d_V \leq 0.9 D_0 \quad (1)$$

where the Venturi body 302 is defined by a diameter $d_V$ and the vane swirl mixer 200 is defined by an inner diameter $D_0$ greater than $d_V$. The static pressure measured at the Venturi body 302 is given by $$P_C = P_0 - \left(\left(\frac{D_0}{d_V}\right)^4 - 1\right) * \frac{1}{2}\rho v_0^2 \quad (2)$$

where $P_C$ is the absolute static pressure at the Venturi body 302, where $P_0$ is the absolute static pressure upstream of the Venturi body 302 (e.g., as measured by a pressure transducer, as measured by a sensor, etc.), where $\rho$ is the density of the exhaust gases, and where $v_0$ is the flow velocity upstream of the Venturi body 302 (e.g., as measured by a sensor, etc.). Due to the difference is diameter between the Venturi body 302 and the vane swirl mixer 200, the Venturi body 302 creates a low pressure region. The low pressure region enhances (e.g., increases, expedites, etc.) decomposition of reductant (e.g., via evaporation, via thermolysis, etc.), ordinary and turbulent diffusion, and mixing of reductant droplets.

The first flow device 206 also includes an upstream mixer 1106 having a plurality of upstream vanes 1108 and a plurality of upstream vane apertures 1112 (see FIG. 3) interspaced therebetween to provide a swirl flow thereby creating additional low pressure regions and facilitating mixing by elongating a mixing trajectory of the first flow device 206. The upstream mixer 1106 is configured to receive the exhaust gases from the vane swirl mixer inlet 202 and to provide the exhaust gases into the Venturi body 302.

Figure 3:
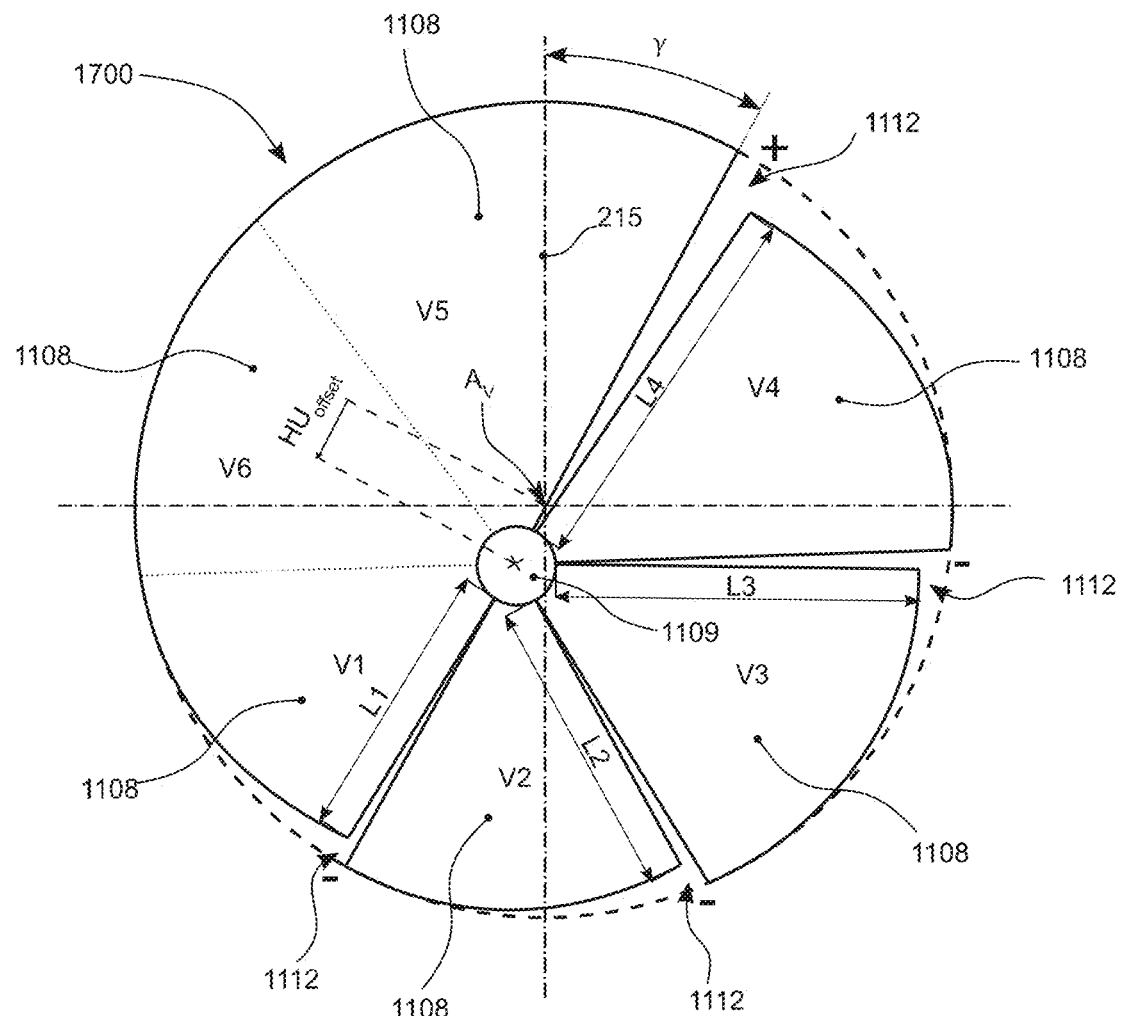
FIG. 3 is front view of a mixer for a vane swirl mixer.

The upstream vanes 1108 are also attached to and conform to a upstream vane hub 1109 that is radially offset from the center axis of the Venturi body 302. The radial offset creates vanes which are variable in geometry, as the radial distance from the upstream vane hub to the Venturi body differs depending on the radial direction. The offset can be in the range of $$0 \leq HU_{offset} \leq 0.25 d_V \quad (3)$$

where $d_V$ is the Venturi diameter and $HU_{offset}$ is the radial offset of the upstream vane hub center from the Venturi center axis, respectively from the mixer center axis, as shown in FIG. 3.

The individual angles may be varied as well to obtain the desired flow split between different vanes. The variable geometry vane design can be optimized to preferentially redirect flow to increase droplet trajectory and thereby improving the mixing of the reductant droplets with the exhaust gas as well as achieving high shear velocity on the Venturi walls to minimize the likelihood of deposit (e.g., urea deposit, etc.) formation.

The upstream vanes 1108 are static and do not move within the Venturi body 302. In this way, the upstream mixer 1106 may be less complex to manufacture and less expensive, and therefore more desirable, than aftertreatment components with complicated components that are expensive and require difficult and time intensive manufacturing. Rather than confining the flow of exhaust gases into a single path to create a swirl flow, the upstream vanes 1108 provide several openings between adjacent upstream vanes 1108, such that each of the upstream vanes 1108 independently swirls the exhaust gases and such that the upstream vanes 1108 collectively form the swirl flow in the exhaust gases.

The upstream vanes 1108 are positioned (e.g., curved, angled, bent, etc.) to cause a swirl (e.g., mixing, etc.) flow of the exhaust gases and the reductant to form a mixture. In various embodiments, the upstream vanes 1108 are substantially straight (e.g., substantially disposed along a plane, having a substantially constant slope along the upstream vane 1108, etc.). In other embodiments, the upstream vanes 1108 are curved (e.g., not substantially disposed along a plane, having different slopes along the upstream vane 1108, having edges which are curved relative to the remainder of the upstream vane 1108, etc.). In still other embodiments, adjacent upstream vanes 1108 are positioned so as to extend over one another. In these embodiments, the upstream vanes 1108 may be straight and/or curved. In embodiments with multiple upstream vanes 1108, each upstream vane 1108 may be independently configured so that the upstream vanes 1108 are individually tailored to achieve a target configuration of the first flow device 206 such that the vane swirl mixer 200 is tailored for a target application.

Each of the upstream vanes 1108 is defined by a vane angle (e.g., relative to a vane hub center axis, etc.) that is related to the swirl produced by that upstream vane 1108. The vane angle may be defined between a vane edge line (e.g. the line co-axial with the radially outermost circumferential edge of the angled part of a vane) and the vane hub center axis. If the vane edge line and the vane hub center axis do not intersect, the vane angle is defined between the vane hub center axis and a plane defined by the vane edge line and a point of intersection of the vane hub center axis with a plane formed by the upstream edges of the vanes. The vane angle for each of the upstream vanes 1108 may be different from the vane angle for any of the others of the upstream vanes 1108. According to various embodiments, the first flow device 206 includes upstream vanes 1108 that have a vane angle of between forty-five and ninety degrees. Similarly, the first flow device 206 may include any number of the upstream vanes 1108. In some embodiments, the first flow device 206 includes between four and twelve upstream vanes 1108.

The upstream vane apertures 1112 collectively define an open area $A_I$. However, the size of the upstream vane apertures 1112 is related to, in part, the diameter of the upstream vane hub 1109. According to various embodiments, the diameter of the upstream vane hub 1109 is given by $$0.05 d_V \leq D_H \leq 0.25 d_V \quad (4)$$

where $D_H$ is the diameter of the upstream vane hub 1109. In application, any of the number of the upstream vanes 1108, the vane angles of the upstream vanes 1108, and the diameter of the upstream vane hub 1109 may be varied to optimize improvements in the flow of the exhaust gases and the reductant, the improvements in the mixing of the reductant, and the improvements in minimizing pressure drop. The upstream mixer 1106 may be configured such that the upstream vanes 1108 are symmetrically or asymmetrically disposed about the upstream vane hub 1109.

The first flow device 206 includes a downstream mixer 309 (see FIG. 2) that includes downstream vanes 310. It is understood that the downstream mixer 309 as shown and described with reference to FIG. 2 may be included in any of the embodiments of the vane swirl mixer 200 discussed herein.

The downstream vanes 310 are attached to an downstream vane hub 313 that is not radially offset from the center axis of the vane swirl mixer 200. However, the downstream vane hub 313 may optionally also be offset in the range of $$0 \leq HD_{offset} \leq 0.25 d_V \quad (5)$$

where $d_V$ is the Venturi diameter and $HD_{offset}$ is the radial offset of the downstream vane hub center from the Venturi center axis, respectively from the mixer center axis, as shown in FIG. 3. $HD_{offset}$ may have the same amount and the same radial direction as the offset $HU_{offset}$ of the upstream vane hub, however it may also be independent from the offset of the upstream vane hub. This offset again creates vanes which are variable in geometry, as the radial distance from the downstream vane hub to the Venturi body differs depending on the radial direction. The downstream vane hub 313 is coupled to the Venturi body 302 (e.g., via members interspacing adjacent downstream vanes 310, etc.). The downstream vanes 310 may be similar to or different from the upstream vanes 1108. Tips (e.g., outermost surfaces, etc.) of each of the downstream vanes 310 may be spaced from the Venturi body 302 by an air gap such that the exhaust gases can pass between the tips of each of the downstream vanes 310 and the Venturi body 302.

The downstream mixer 309 includes a plurality of downstream vane apertures interspaced between the plurality of downstream vanes 310. In this way, the plurality of upstream vanes and the plurality of downstream vane apertures provide a swirl flow within the first flow device 206. The downstream vanes 310 are attached to and conform to the Venturi body 302 such that the exhaust gases can only exit the Venturi body 302 through the downstream vane apertures. The plurality of upstream vane apertures cooperate with the plurality of downstream vanes 310 to provide the exhaust gases into the first flow device 206 with a swirl flow that facilitates mixing of the reductant and the exhaust gases. The downstream vanes 310 may be configured to create a swirl flow (e.g., co-swirl flow, counter-swirl flow, etc.) that is separate from the swirl flow created by the upstream vanes 1108. In this way, the downstream vanes 310 can be utilized to increase or decrease the total swirl created by the first flow device 206. Further, the downstream vanes 310 may increase mixing of the reductant and the exhaust gases within the Venturi body 302.

In the embodiment shown in FIG. 2, the upstream vanes 1108 are located upstream of where the reductant is introduced while the downstream vanes 310 are located downstream of where the reductant is introduced. In this embodiment, the upstream vanes 1108 create a first swirl flow in a first direction and the downstream vanes 310 create a second swirl flow in a second direction that may be the same as the first direction (e.g., co-swirl flow, etc.) or opposite to the first direction (e.g., counter-swirl flow, etc.). Rather than confining the flow of exhaust gases into a single path to create a swirl flow, the upstream vanes 1108 provide several openings between adjacent upstream vanes 1108, such that each of the upstream vanes 1108 independently swirls the exhaust gases and such that the upstream vanes 1108 collectively form the swirl flow in the exhaust gases.

The upstream vanes 1108 and/or the downstream vanes 310 may be constructed (e.g., manufactured, made, etc.) using sheet metal (e.g., aluminum sheets, steel sheets, etc.) in various applications. For example, the upstream vanes 1108 and/or the downstream vanes 310 may be constructed through stamping, punching, laser cutting, waterjet cutting, bending and/or welding operations.

FIG. 3 shows an example of swirl mixer vanes with different geometries. The vane hub has been moved in the direction of the vane edge of vane V1, thereby creating vanes 1108 with vane edges increasing in lengths from vane edge length L1 to vane edge length L4 (moving counter-clockwise). Vane V4 is also bent by a larger angle compared to V1, V2 and V3 thus creating a bigger opening and allowing a higher fraction of the overall flow to go through it. This is depicted in FIG. 3 by the plus symbol "+" (indicating a smaller vane open angle) at the gap between V4 and V5 and the minus symbol "−" (indicating a larger vane open angle) at the gaps between vanes V1 and V2, V2 and V3 and V3 and V4 respectively. The vane angle may be different for each of the vanes of the vane swirl mixer.

FIG. 3 illustrates a combined upstream vane 1700 in one embodiment. The combined upstream vane 1700 may be formed in a variety of manners. In various embodiments, the combined upstream vane 1700 is formed from a large upstream vane 1108 which is folded flat (e.g., at a vane angle of ninety degrees, etc.). In these embodiments, the large upstream vane 1108 may be twice the size of the other upstream vanes 1108. In other embodiments, the combined upstream vane 1700 is formed from a first upstream vane V5 and a second adjacent and contiguous upstream vane V6. In these embodiments, the first adjacent upstream vane V5 and the second adjacent upstream vane V6 each have a vane angle of ninety degrees and then the first adjacent upstream vane V5 and the second adjacent upstream vane V6 are either joined directly (e.g., adjacent edges of each of the first adjacent upstream vane V5 and the second adjacent upstream vane V6 are attached together, etc.) or indirectly (e.g., a spanning member is attached to each of the first adjacent upstream vane V5 and the second adjacent upstream vane V6, etc.).

The vane edges may further be at an angle γ to a doser injection axis 215 that is directed towards the center of the Venturi, the angle γ being defined between the doser injection axis 215 and the radial edge of a vane which is circumferentially nearest. The angle γ can be between ±360/ 2n, where n is the number of vanes (counting both open and closed vanes). In the embodiment illustrated in FIG. 3 the angle γ is defined between the doser injection axis 215 and the edge of vane V5 nearest to the doser injection axis. In a vane swirl mixer with n=6, as depicted in FIG. 3, the angle γ can be between −30 degrees (counter-clockwise direction in FIG. 3) and +30 degrees (clockwise direction in FIG. 3). For the sake of calculation, combined vanes may always be regarded as individual closed vanes, similar to the vanes V5 and V6 depicted in FIG. 3.

Figure 4:
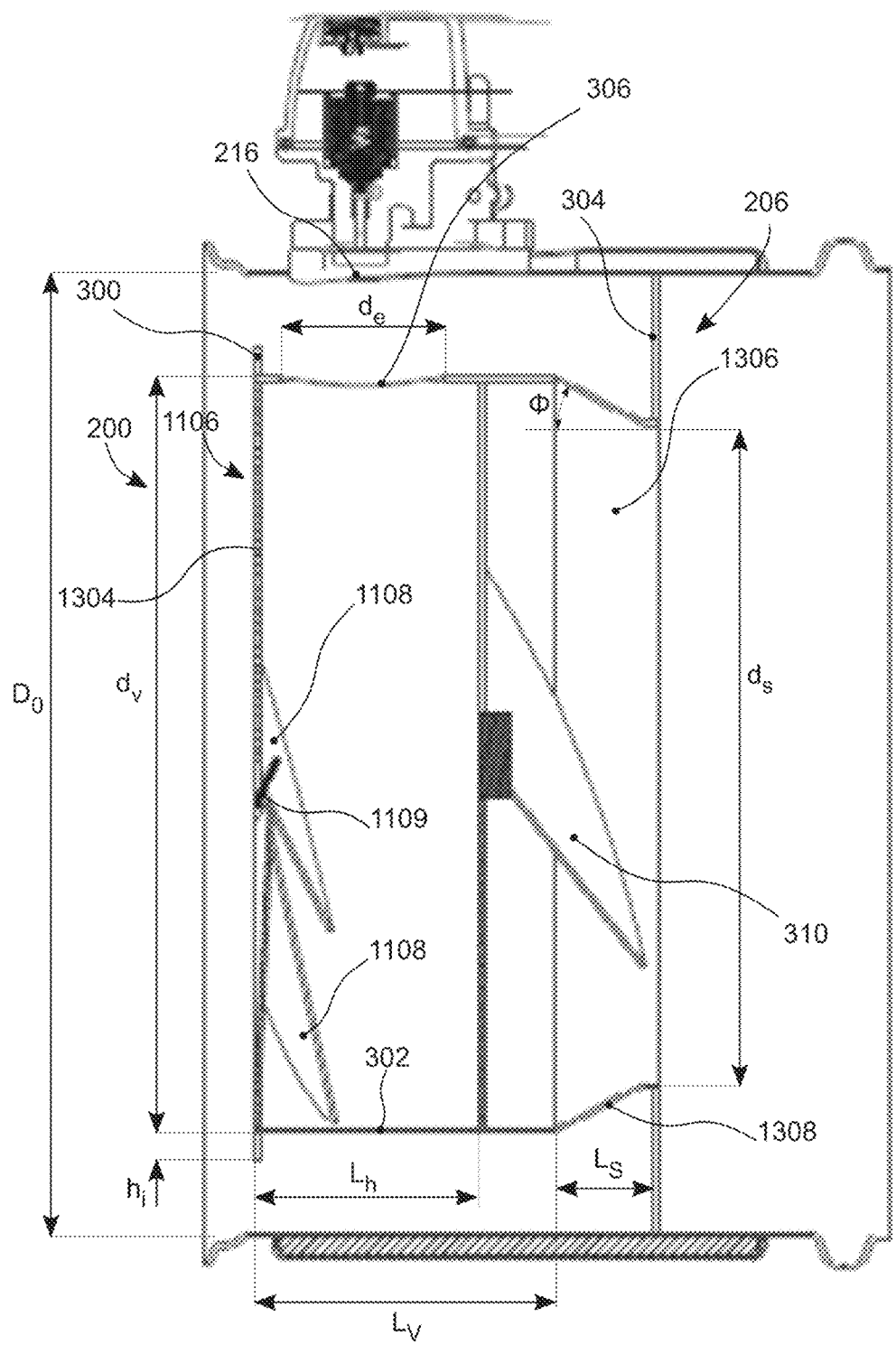
FIG. 4 is a cross-sectional view similar to FIG. 2, showing more dimensions of the vane swirl mixer.

FIG. 4 illustrates a cross-sectional view of the vane swirl mixer 200. The upstream mixer 1106 is located upstream of the exhaust gas guide aperture 306 (see also FIG. 2) and the first flow device 206 is located downstream of the exhaust gas guide aperture 306. The upstream mixer 1106 functions to create a swirl flow of the exhaust gases within the first flow device 206 downstream the upstream mixer 1106. The swirl flow created by the upstream mixer 1106 facilitates distribution of the reductant in the exhaust gases between the upstream mixer 1106 and the downstream vanes 310 such that the reductant is substantially evenly distributed within the exhaust gases when the exhaust gases encounter the downstream vanes 310. Additionally, the swirl flow created by the upstream mixer 1106 creates a relatively large shear at the Venturi body 302 (e.g., the portion of the Venturi body 302 between the upstream vanes 1108 and the downstream vanes 310, etc.) to reduce the formation of a film, and therefore the accumulation of deposits, along the Venturi body 302. The downstream vanes 310 function to impart a swirl flow on the exhaust gases and entrained reductant downstream of the first flow device 206. This swirl flow causes the exhaust gases to be relatively uniform (e.g., in terms of reductant composition, etc.) downstream of the first flow device 206, such as at the vane swirl mixer outlet 204 (e.g., proximate an inlet of the SCR catalyst 106, etc.).

The Venturi body 302 is defined by a body center axis $A_V$. The Venturi body 302 is centered on (e.g., a centroid of the Venturi body 302 is coincident with, etc.) the body center axis $A_V$. The upstream vane hub 1109 is centered on an offset axis $h_r$. The radial offset $HU_{offset}$, as can be seen in FIG. 3, of the offset axis $h_r$ causes any reductant build up on the Venturi body 302 (e.g., non-uniform distribution of the reductant in the exhaust gases within the first flow device 206, etc.) to be substantially redistributed to the exhaust gases downstream of the first flow device 206. While the offset axis $h_r$ is offset from the Venturi center axis $A_V$ away from the port 216 by the radial offset $HU_{offset}$ in FIG. 4, it is understood that the offset axis $h_r$ may be offset from the Venturi center axis $A_V$ towards the port 216 by the radial offset $HU_{offset}$, or offset from the Venturi center axis $A_V$ towards the Venturi body 302 in any radial direction (e.g., orthogonally to the port 216, at an angle to a doser axis, etc.) by the radial offset $HU_{offset}$.

The Venturi body 302 has a body inlet 1304 and a body outlet 1306. The inlet has a diameter $d_V$ and the outlet has a diameter $d_S$ which is typically less than the diameter $d_V$. The diameter $d_V$ and the diameter $d_S$ are each less than the diameter $D_0$ of the vane swirl mixer 200. In various embodiments, the vane swirl mixer 200 and the first flow device 206 are configured such that $$0.4 D_0 \leq d_V \leq 0.9 D_0 \quad (6)$$

$$0.7 d_V \leq d_S \leq d_V \quad (7)$$

$$0 \leq h_r \leq 0.1 D_0 \quad (8)$$

In various embodiments, the first support flange 304 does not protrude into the Venturi body 302 (e.g., the first support flange 304 defines an aperture contiguous with the Venturi body 302 and having a diameter equal to the diameter $d_S$, etc.).

In various embodiments, the funneling edge 300 radially protrudes from the body inlet 1304 towards the vane swirl mixer 200 a distance $h_i$. In various embodiments, the first flow device 206 is configured such that $$0 \leq h_i \leq 0.1 d_V \quad (9)$$

By varying the distance $h_i$, the flows of the exhaust gas into the first flow device 206 and/or the exhaust gas guide aperture 306 may be optimized.

The reductant flows from the port 216 through the exhaust gas guide aperture 306. The exhaust gas guide aperture 306 is generally circular and defined by a diameter $d_e$. In various embodiments, the first flow device 206 is configured such that $$d_e = (D_0 - d_V - 2h_r) * \tan\left(\frac{\alpha + \delta}{2}\right) \quad (10)$$

where $$5° \leq \delta \leq 20° \quad (11)$$

where δ is a margin that is selected based on the configuration of the first flow device 206 and where α is a spray angle of a nozzle directing the flow of exhaust gas. In some embodiments the exhaust gas guide aperture 306 is elliptical. In these embodiments, the diameter $d_e$ may be a major axis (e.g., as opposed to a minor axis, etc.) of the exhaust gas guide aperture 306.

The first flow device 206 is also defined by a spacing $L_h$ between the upstream mixer 1106 and the downstream mixer 309. The spacing $L_h$ can be a fixed distance between the upstream mixer and the downstream mixer independent of the diameter $D_0$ of the vane swirl mixer 200 and the inlet diameter $d_V$ or the outlet diameter $d_S$. This allows for a wide range of scaling options of the mixer diameters while keeping the overall length of the vane swirl mixer 200 minimal. Previous exhaust gas mixers were not able to scale the diameter of the exhaust gas mixer independently of the mixer length. This allows for an increased exhaust gas mixer diameter without increasing the length required to fit the vane swirl mixer within the exhaust unit. The diameter $D_0$ of the vane swirl mixer 200 and the Venturi inlet diameter $d_V$ can be changed based on the space claim and the performance targets of the application. The diameter $D_0$ of the vane swirl mixer 200 may range from 8 inches (20.32 cm) to 15 inches (38.1 cm) while the Venturi inlet diameter $d_V$ may range from 2 inches (5.08 cm) to 13.5 inches (34.29 cm) while keeping the spacing $L_h$ a constant.

In various embodiments, the first flow device 206 is configured such that $$d_e \leq L_h \leq \frac{d_e(D + d_v - 2*HU_{offset})}{(D - d_v - 2*HU_{offset})} \quad (12)$$

The Venturi body 302 includes a shroud 1308. It is understood that the shroud 1308 as shown and described with reference to FIG. 4 may be included in any of the embodiments of the vane swirl mixer 200 discussed herein.

The shroud 1308 defines a downstream end of the Venturi body 302 and is therefore defined by the diameter $d_S$. In various embodiments, the shroud 1308 is cylindrical or conical (e.g., frustoconical, etc.) in shape. The shroud 1308 may facilitate a reduction in stratification of the exhaust gases that occurs from centrifugal force created by the downstream mixer 309. Additionally, the shroud 1308 may provide structural support to the downstream mixer 309, such as when the downstream vanes 310, in addition to the downstream vane hub 313, are attached to the shroud 1308 (e.g., such that the downstream vanes 310 conform to the shroud 1308, etc.). When the downstream vanes 310 are attached to the shroud 1308, the downstream vanes 310 may provide a more directed swirl flow (e.g., along a target trajectory, etc.) by removing leak paths, thereby improving mixing performance (e.g., the ability of the downstream mixer 309 to mix the reductant and exhaust gases, etc.) and reducing the accumulation of deposits downstream of the downstream mixer 309 (e.g., in the shroud 1308, in the exhaust component downstream of the vane swirl mixer 200, etc.). Furthermore, the shroud 1308 substantially prevents leakage flow and liquid film accumulation and mitigates the formation of deposits within the first flow device 206 (e.g., on the Venturi body 302, etc.) and/or the vane swirl mixer 200. The shroud 1308 is defined by an angle Φ relative to an axis parallel to the Venturi center axis $A_V$ and the mixer center axis. In various embodiments, the first flow device 206 is configured such that $$\Phi \leq 50° \quad (13)$$

In various embodiments, the first flow device 206 is configured such that $$L_S = \frac{d_v - d_S}{2 * \tan\Phi} \quad (14)$$

where $L_S$ is the length of the shroud 1308. Where the shroud 1308 is cylindrical, the diameter $d_S$ is equal to the diameter $d_v$ and $$0.02 d_v \leq L_S \leq 0.25 d_v \quad (15)$$

In some embodiments, at least one of the flow devices of the vane swirl mixer 200 is angled relative to the mixer center axis. For example, the first flow device 206 may be configured such that the Venturi center axis $A_V$ is tilted up from (e.g., angled at a positive angle relative to, etc.) the mixer center axis or such that the Venturi center axis $A_V$ is tilted down from (e.g., angled at a negative angle relative to, etc.) the mixer center axis.

The upstream vanes 1108 may be spaced from the Venturi body 302 by a gap g. In various embodiments, the first flow device 206 is configured such that $$0 \leq g \leq 0.15 d_V \quad (16)$$

The gap g may mitigate accumulation of reductant deposits on the Venturi body 302. The gap g functions to create a substantially axial flow of exhaust gases directed along the Venturi body 302 (e.g., on the inner surfaces of the Venturi body 302, etc.). In this way, the gap g may balance flow (e.g., a main tangential flow, etc.) of the exhaust gases through the upstream vanes 1108 with the aforementioned axial flow and a flow of the exhaust gases around the first flow device 206. Instead of, or in addition to, the gap g, the upstream vanes 1108 may include slots (e.g., thin slots) or holes through which the exhaust gases may flow. For example, each of the upstream vanes 1108 may include a slot contiguous with an outermost edge of the upstream vane 1108. In this example, the exhaust gases may flow through the slot and against the Venturi body 302 proximate the slot, thereby providing benefits similar to those of the gap g.

In FIG. 4, the downstream vanes 310 are shown in contact with the shroud 1308 such that no gap exists between at least a portion of each of the downstream vanes 310 and the shroud 1308. In an example embodiment, the tip (e.g., the most radially outward surface, etc.) of each of the downstream vanes 310 is welded (e.g., fused, etc.) to the shroud 1308.

In some embodiments, the downstream vanes 310 may be spaced from the shroud 1308 by a gap $g_v$. In various embodiments, the first flow device 206 is configured such that $$0 \leq g_v \leq 0.15 d_V \quad (17)$$

The gap $g_v$ may mitigate accumulation of reductant droplets on the shroud 1308. The gap $g_v$ functions to create a substantially axial flow of exhaust gases directed along the shroud 1308 (e.g., on inner surfaces of the shroud 1308, etc.). Instead of, or in addition to, the gap $g_v$, the downstream vanes 310 may include slots (e.g., thin slots) or holes through which the exhaust gases may flow. For example, each of the downstream vanes 310 may include a slot contiguous with an outermost edge of the downstream vane 310. In this example, the exhaust gases may flow through the slot and against the shroud 1308 proximate the slot, thereby providing benefits similar to those of the gap g.

In some embodiments, the tip of each of the upstream vanes 1108 is attached (e.g., welded, coupled, etc.) to the Venturi body 302 (e.g., such that the upstream vanes 1108 conform to the Venturi body 302, etc.). When the upstream vanes 1108 are attached to the Venturi body 302, the upstream vanes 1108 may provide a more directed swirl flow (e.g., along a target trajectory, etc.) by removing leak paths, thereby improving mixing performance (e.g., the ability of the upstream mixer 1106 to mix the reductant and exhaust gases, etc.) and reducing the accumulation of deposits downstream of the upstream mixer 1106 (e.g., in the Venturi body 302, on the downstream mixer 309, in the exhaust component downstream of the vane swirl mixer 200, etc.). In FIG. 4, the upstream vanes 1108 are shown in contact with the Venturi body 302 such that no gap exists between at least a portion of each of the upstream vanes 1108 and the Venturi body 302.

Each of the upstream vanes 1108 is defined by an upstream vane angle relative to an upstream vane hub center axis of the upstream vane hub 1109 of the upstream vanes 1108. Similarly, the downstream vane angle for each of the downstream vanes 310 is defined relative to a downstream vane hub center axis of the downstream vane hub 313. The upstream vane angle for each of the upstream vanes 1108 may be different from the upstream vane angle for any of the others of the upstream vanes 1108. In various embodiments, the upstream vane angle for each of the upstream vanes 1108 is between forty five degrees and ninety degrees, inclusive, relative to a downstream vane hub center axis of the downstream vane hub 313 and the downstream vane angle for each of the downstream vanes 310 is between forty five degrees and ninety degrees, inclusive. The upstream vane angle for each of the upstream vanes 1108 may be selected such that the first flow device 206 is tailored for a target application. Similarly, the downstream vane angle for each of the downstream vanes 310 may be selected such that the first flow device 206 is tailored for a target application. The upstream mixer 1106 may be configured such that the upstream vanes 1108 are symmetrically or asymmetrically disposed about the upstream vane hub 1109.

The upstream vane angle may be different for each of the upstream vanes 1108 and the downstream vane angle may be different from each of the downstream vanes 310. Selection of the upstream vane angle for each of the upstream vanes 1108 and the downstream vane angle for each of the downstream vanes 310 may be made so as to create asymmetric swirl of the exhaust gases, to direct flow of the exhaust gases (e.g., towards a target location in the vane swirl mixer 200, etc.), to more uniformly distribute reductant within the exhaust gases, and to reduce deposits within the first flow device 206 (e.g., on the Venturi body 302, etc.) and/or the vane swirl mixer 200.

Figure 5:
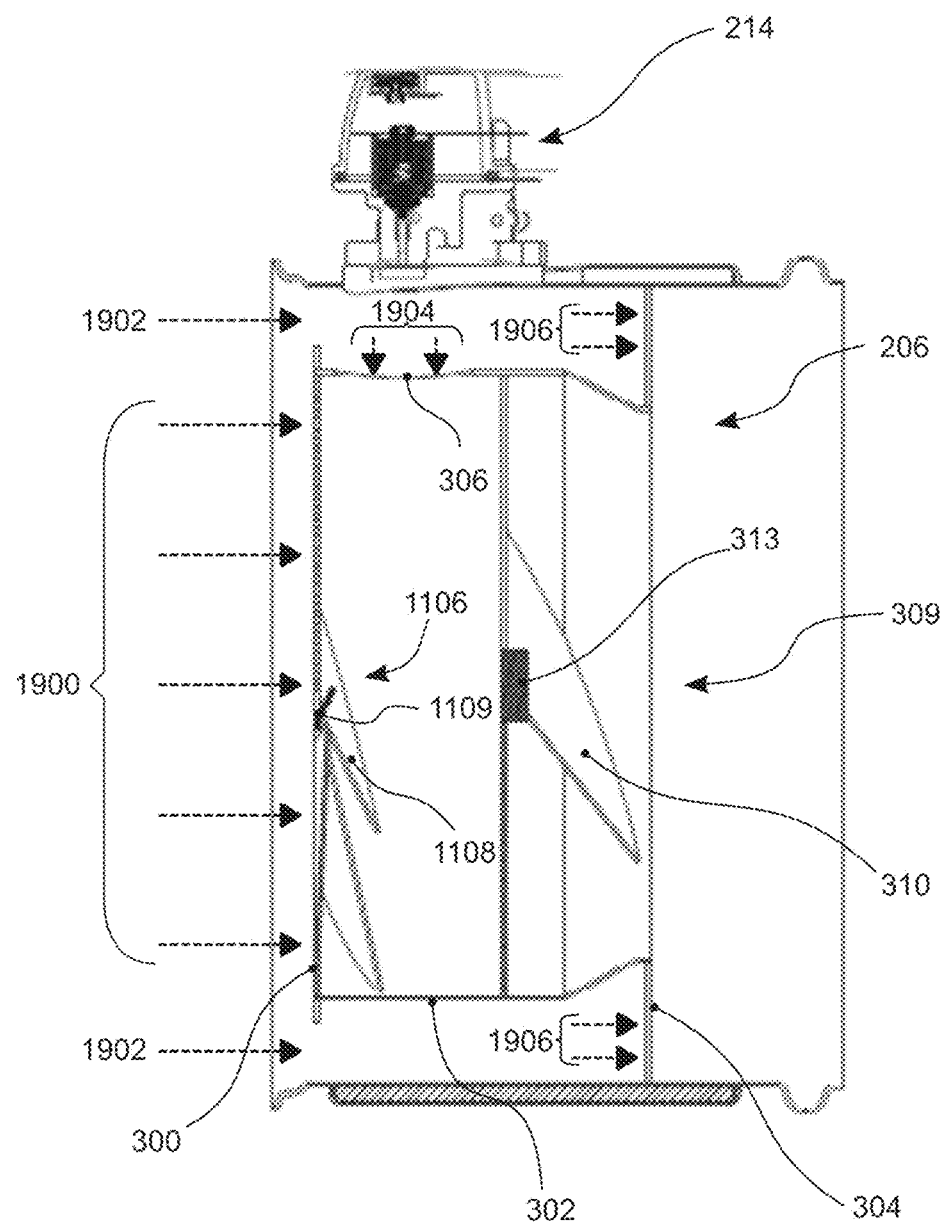
FIG. 5 is a cross-sectional view of another vane swirl mixer.

FIG. 5 illustrates the flow of exhaust gases within the vane swirl mixer 200 and illustrates how the exhaust gases behave when encountering the first flow device 206. The exhaust gases upstream of the first flow device 206 are divided into a main flow 1900 (e.g., Venturi flow, swirl flow, etc.) and a circumvented flow 1902 (e.g., exhaust assist flow, etc.). The main flow 1900 is provided into the first flow device 206 (e.g., the main flow 1900 is funneled into the Venturi body 302 by the funneling edge 300, etc.).

In some embodiments, the circumvented flow 1902 is 5-40%, inclusive, of the sum of the circumvented flow 1902 and the main flow 1900 (e.g., the total flow, etc.). In these embodiments, the main flow 1900 is 60-95%, inclusive, of the sum of the circumvented flow 1902 and the main flow 1900 (e.g., the total flow, etc.). Accordingly, where the vane swirl mixer 200 includes six upstream vanes 1108, each gap between adjacent upstream vanes 1108 receives 6-16%, inclusive, of the sum of the circumvented flow 1902 and the main flow 1900 (e.g., the total flow, etc.).

The main flow 1900 and the circumvented flow 1902 define a flow split. The flow split is a ratio of the circumvented flow 1902 to the main flow 1900, represented as a percentage of the main flow 1900. The flow split is a function of the diameter $d_V$, the diameter $d_e$, and the distance $h_i$. By varying the flow split, an optimization of target mixing performance (e.g., based on a computational fluid dynamics analysis, etc.) of the first flow device 206, target deposit formation (e.g., a target amount of deposits formed over a target period of time, etc.), and target pressure drop (e.g., a comparison of the pressure of the exhaust gases upstream of the first flow device 206 and a pressure of the pressure of the exhaust gases downstream of the first flow device 206, etc.), can be performed such that the first flow device 206 can be tailored for a target application. In various embodiments, the flow split ratio is between five percent and seventy percent, inclusive. That is, the circumvented flow 1902 is between five percent and seventy percent, inclusive, of the main flow 1900.

The circumvented flow 1902 is divided into a diverted flow 1904 and an isolated flow 1906. The diverted flow 1904 is mixed with the reductant provided to the first flow device 206 through the port 216. For example, the circumvented flow 1902 may enter the Venturi body 302 as the diverted flow 1904 directly through the exhaust gas guide aperture 306.

The isolated flow 1906 does not enter the first flow device 206 immediately and instead encounters the first support flange 304. In various embodiments, the first support flange 304 is sealed against the vane swirl mixer 200 and the Venturi body 302, and does not permit the passage of the isolated flow 1906 through or around the first support flange 304. In these embodiments, the isolated flow 1906 flows back towards the body inlet 1304. As the isolated flow 1906 flows back towards the body inlet 1304, a portion of the isolated flow 1906 may flow into the Venturi body 302 as the diverted flow 1904. Other portions of the isolated flow 1906 may flow past the exhaust gas guide aperture 306 and enter the Venturi body 302 through the body inlet 1304 as the main flow 1900. In other embodiments, the first support flange 304 includes at least one aperture permitting the passage of the exhaust gases therethrough, thereby allowing at least a portion of the isolated flow 1906 to bypass the body entirely. This portion of the isolated flow 1906 would mix with the main flow 1900 downstream of the body outlet 1306 (e.g., after the main flow 1900 has combined with the diverted flow 1904 and the reductant within the Venturi body 302, etc.).

According to the embodiment shown in FIG. 5, the main flow 1900 is passed through the upstream vanes 1108, mixed with reductant and the diverted flow 1904, and then passed through the downstream vanes 310, through the shroud 1308, and out of the body outlet 1306.

Figure 6:
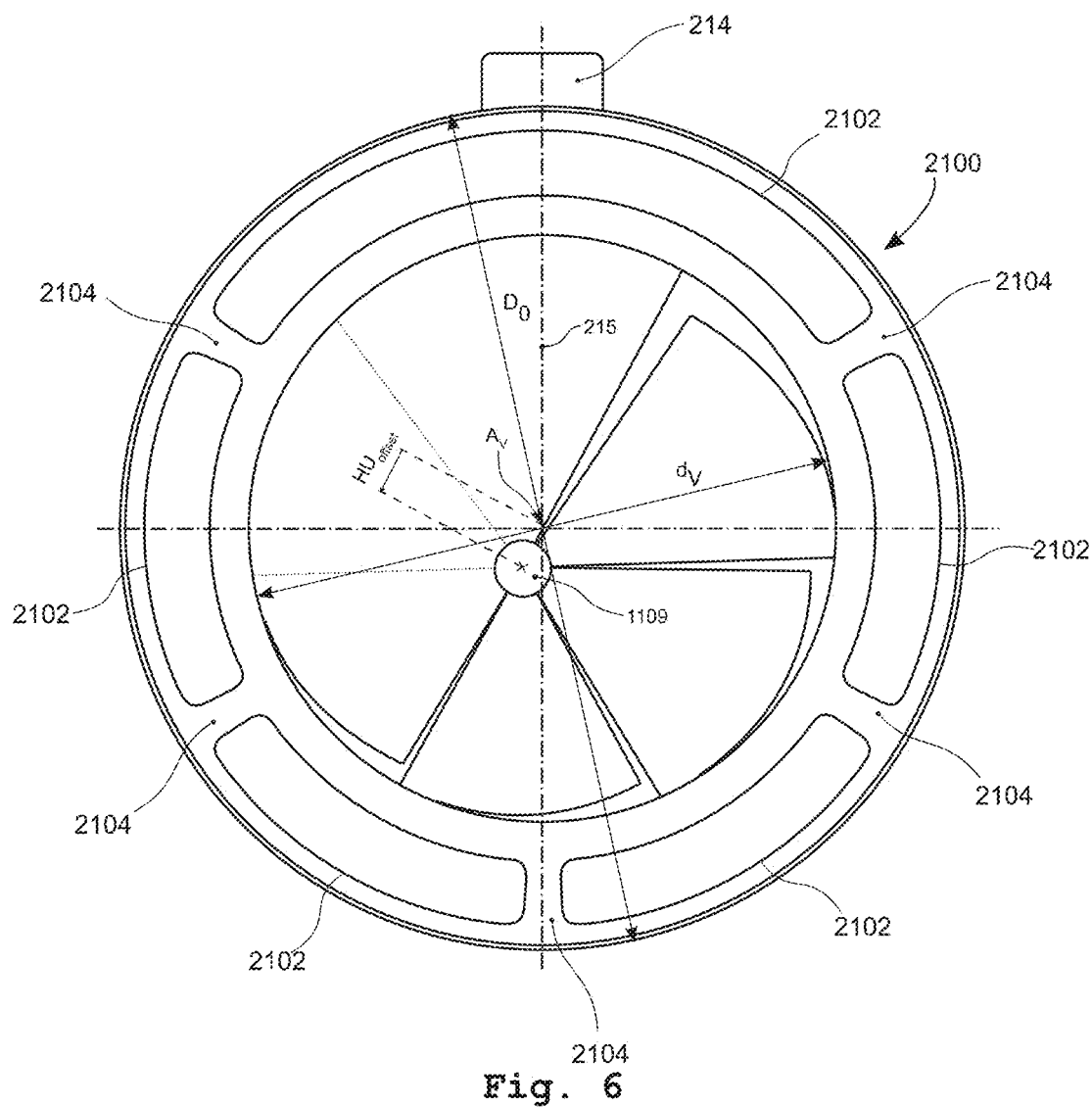
FIG. 6 is a view onto an upstream face of a vane swirl mixer showing a design which can be implemented in any of the vane swirl mixers shown and described herein.

FIG. 6 illustrates a second support flange 2100 according to an example embodiment. It is understood that the second support flange 2100 as shown and described with reference to FIG. 6 may be included in any of the embodiments of the vane swirl mixer 200 discussed herein. The second support flange may be coupled to the Venturi body upstream of the exhaust gas guide aperture 306, as shown in FIG. 6, which illustrates a view of an upstream face of the first flow device 206. The second support flange 2100 may also be coupled to the Venturi body 302 downstream of the exhaust gas guide aperture 306 but upstream of the first support flange 304. The second support flange 2100 may also be coupled to the Venturi body 302 upstream of the exhaust gas guide aperture 306. In some embodiments, the second support flange 2100 is contiguous with the funneling edge 300 (e.g., the funneling edge 300 is a part of the second support flange 2100, etc.).

The second support flange 2100 includes a plurality of second support flange apertures 2102 (e.g., holes, passages, pathways, etc.). The circumvented flow 1902 traverses the second support flange 2100 through the second support flange apertures 2102. In various embodiments, the second support flange 2100 may include one, two, three, four, five, six, or more second support flange apertures 2102.

Each of the second support flange apertures 2102 is separated from an adjacent one of the second support flange apertures 2102 by a second support flange connector 2104 (e.g., arm, rod, etc.). The second support flange connector 2104 is integrated with the second support flange 2100 and is coupled to the vane swirl mixer 200 and to the first flow device 206. In one example, the second support flange connector 2104 is coupled to the Venturi body 302 while the first support flange 304 is coupled to the shroud 1308. In some embodiments, the second support flange 2100 is coupled to the funneling edge 300 (e.g., the funneling edge 300 is a part of the second support flange 2100, etc.).

The second support flange 2100 does not protrude into the body inlet 1304 (e.g., the second support flange 2100 defines an aperture contiguous with the Venturi body 302 and having a diameter equal to the diameter $d_V$, etc.). In various embodiments, the second support flange 2100 includes one, two, three, four, five, six, or more second support flange connectors 2104. In some embodiments, the number of second support flange apertures 2102 is equal to the number of second support flange connectors 2104.

In this embodiment, the doser 214 is aligned with the center of the Venturi. The doser 214 can also be aligned with the offset upstream vane hub 1109 or downstream vane hub 313. Alternatively, the doser 214 may also be aligned with the Venturi axis, however a doser nozzle may direct the flow of the reductant towards the offset upstream vane hub center 1109 and the corresponding axis $h_r$.

The second support flange apertures 2102 are distributed about the circumference of the Venturi body 302. In this embodiment the largest second support flange aperture 2102 is twice the size of the other four second support flange apertures 2102 and is arranged so that the circumvented flow 1902 is directed towards the doser 214 and the exhaust gas guide aperture 306 unhindered. To this end, the largest second support flange aperture 2102 may preferably further be circumferentially centered on the doser injection axis 215. Alternatively the second support flange apertures 2102 are arranged such that no second support flange connectors 2104 are located upstream of the doser 214 and the exhaust gas guide aperture 306 in the direction of the circumvented flow 1902.

Figure 7A:
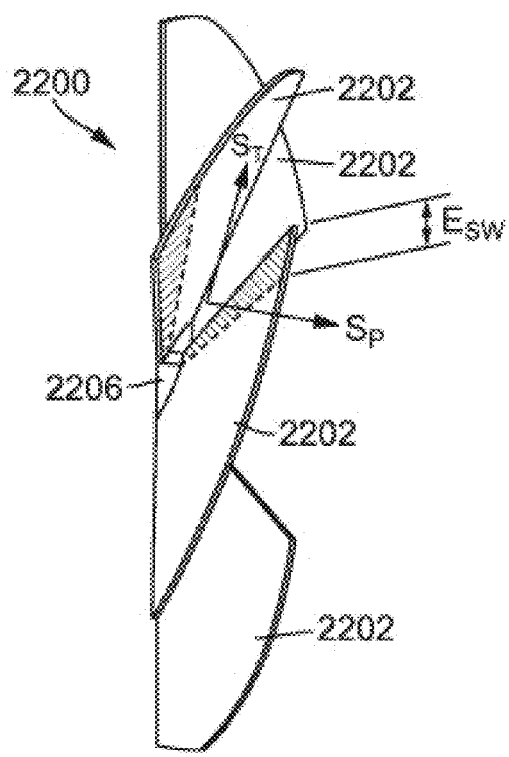
FIG. 7A is a side view of another mixer for a vane swirl mixer.
Figure 7B:
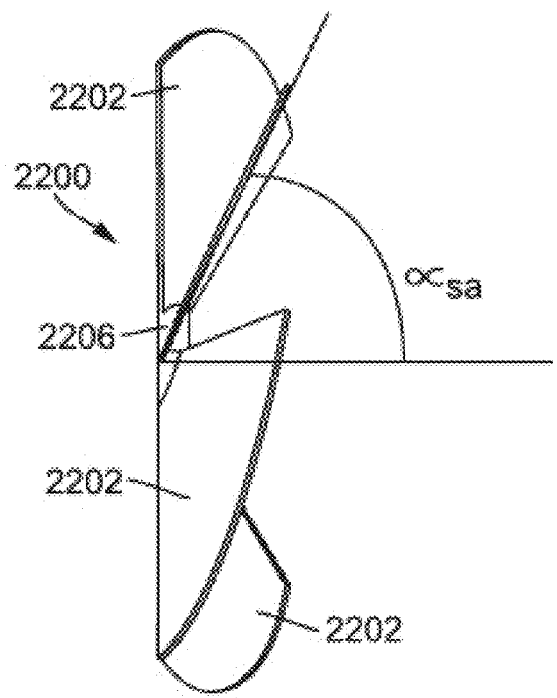
FIG. 7B is another side view of the mixer shown in FIG. 7A.

FIGS. 7A and 7B illustrate a conduit straight vane mixer 2200 according to an example embodiment. It is understood that the conduit straight vane mixer 2200 as shown and described with reference to FIGS. 7A and 7B may be included in any of the embodiments of the vane swirl mixer 200 discussed herein.

The conduit straight vane mixer 2200 includes a plurality of conduit straight vanes 2202 each coupled to and conforming with a conduit straight vane hub 2206. Rather than forming apertures between any of the conduit straight vanes 2202, as are formed between adjacent upstream vanes 1108, any of the conduit straight vanes 2202 and any combined conduit straight vanes form conduits therebetween. As explained herein, a conduit is a closed pathway with a single inlet and a single outlet (e.g., is bounded on four out of six sides, etc.).

While not shown, tips (e.g., outermost edges, etc.) of each of the conduit straight vanes 2202 is coupled to and conforms with the shroud 1308 or Venturi body 302. The trailing edge of one of the conduit straight vanes 2202 or combined conduit straight vanes extends beyond the leading edge of an adjacent one of the conduit straight vanes 2202 or combined conduit straight vanes in a streamwise direction $S_t$ and thereby confines a flow of exhaust gases in a spanwise direction $S_p$. The streamwise direction $S_t$ is tangential to a plane of the conduit straight vane at the tip of the leading edge while the spanwise $S_p$ is normal to (e.g., orthogonal to, etc.) the streamwise direction $S_t$ respectively to the plane of the conduit straight vane at the tip of the leading edge. This spanwise confinement combined with the conforming coupling of the conduit straight vanes 2202 to the conduit straight vane hub 2206 and to the shroud 1308 (both of which confine flow in wall normal directions) create a conduit for each of the conduit straight vanes 2202. Each conduit has four sides: a first defined by one conduit straight vane 2202 or combined conduit straight vane, a second defined by the conduit straight vane hub 2206, a third defined by the shroud 1308 or Venturi body 302, and a fourth defined by another conduit straight vane 2202 or combined conduit straight vane. Each conduit efficiently directs the exhaust gases. In various embodiments, the conduit straight vane mixer 2200 is utilized in the first flow device 206 in place of the downstream mixer 309. In other embodiments, the conduit straight vanes 2202 are not coupled to the shroud 1308 and instead are coupled to and conform with the Venturi body 302. In these embodiments, the conduit straight vanes 2202 are instead coupled to and conform with the Venturi body 302. In such embodiments, the conduit straight vane mixer 2200 may be utilized in place of or in addition to the upstream mixer 1106.

In some embodiments, the conduit straight vane mixer 2200 includes two, three, four, five, six, seven, eight, or more conduit straight vanes 2202. Like the upstream vanes 1108, each of the conduit straight vanes 2202 is defined by a blade angle. These blade angles may be varied such that a combined conduit straight vane (not shown) may be formed as described with regard to the combined upstream vane 1700 above. In some embodiments, the conduit straight vane mixer 2200 includes one, two, three or more of the combined conduit vanes. In other embodiments, the conduit straight vane mixer 2200 does not include the combined conduit vane. In an example embodiment, the conduit straight vane mixer 2200 includes three of the conduit straight vanes 2202 and one combined conduit straight vane.

The conduit straight vane hub 2206 is offset from the mixer center axis by $HU_{offset}$, as detailed above.

Each of the conduit straight vanes 2202 and combined conduit straight vane extend over an adjacent conduit straight vane 2202 or combined conduit straight vane. This distance is shown in FIG. 7A as extension distance $E_{sw}$. The extension distance $E_{sw}$ is expressed as a percentage of the width in the streamwise direction $S_t$ of a single conduit straight vane 2202 at a given distance from the axis (e.g., the Venturi center axis $A_V$, the mixer center axis, etc.) upon which the conduit straight vane hub 2206 is centered. In various embodiments, this extension distance $E_{sw}$ is between 0% and 75%, inclusive, of the width in the streamwise direction $S_t$ of a single conduit straight vane 2202 at a given distance from the axis upon which the conduit straight vane hub 2206 is centered. The extension distance $E_{sw}$ may differ for each of the individual conduit straight vanes 2202 (e.g., one conduit straight vane 2202 having an extension distance $E_{sw}$ of 25%, an adjacent conduit straight vane 2202 having an extension distance $E_{sw}$ of 40%, another conduit straight vane 2202 having an extension distance $E_{sw}$ of 75%.

The conduit straight vane mixer 2200 provides relatively high swirl velocities even at lower blade angles for each of the conduit straight vanes 2202, thereby providing enhanced mixing of reductant with a lower pressure drop. Another benefit of the high swirl velocities provided by the conduit straight vanes 2202 and the combined conduit straight vane is that high swirl velocities mitigate accumulation of deposits downstream of the conduit straight vane mixer 2200 (e.g., along the Venturi body 302, along the shroud 1308, etc.).

Each of the conduit straight vanes 2202 and the combined conduit straight vane is defined by a streamwise angle $\alpha_{sa}$, relative to an axis upon which the conduit straight vane hub 2206 is centered. In various embodiments, the streamwise angle $\alpha_{sa}$, is between thirty degrees and ninety degrees, inclusive. The streamwise angle $\alpha_{sa}$ for each of the conduit straight vanes 2202 and the combined conduit straight vanes may be selected such that the first flow device 206 is tailored for a target application.

The streamwise $\alpha_{sa}$ and the streamwise extension distance $E_{sw}$ may be different for each of the conduit straight vanes 2202 and/or the combined conduit straight vanes. Selection of streamwise $\alpha_{sa}$ and streamwise extension distance $E_{sw}$ for each of the conduit straight vanes 2202 and/or the combined conduit straight vanes may be made so as to create asymmetric swirl of the exhaust gases, to direct flow of the exhaust gases (e.g., towards a target location in the vane swirl mixer 200, etc.), to more uniformly distribute reductant within the exhaust gases, and/or to reduce deposits within the first flow device 206 (e.g., on the Venturi body 302, etc.) and/or the vane swirl mixer 200.

The conduit straight vanes 2202 and/or the combined conduit straight vanes may be constructed using casting (e.g., investment casting, lost foam casting, sand casting, etc.) and/or 3D printing. For example, the conduit straight vane mixer 2200 may be printed using a 3D printer by using a file which specifies the number of the conduit straight vanes 2202, the number of the combined conduit straight vanes, the streamline $\alpha_{sa}$ for each of the conduit straight vanes 2202 and combined conduit straight vanes, and the streamwise extension $E_{sw}$ for each of the conduit straight vanes 2202 and combined conduit straight vanes.

Figure 8:
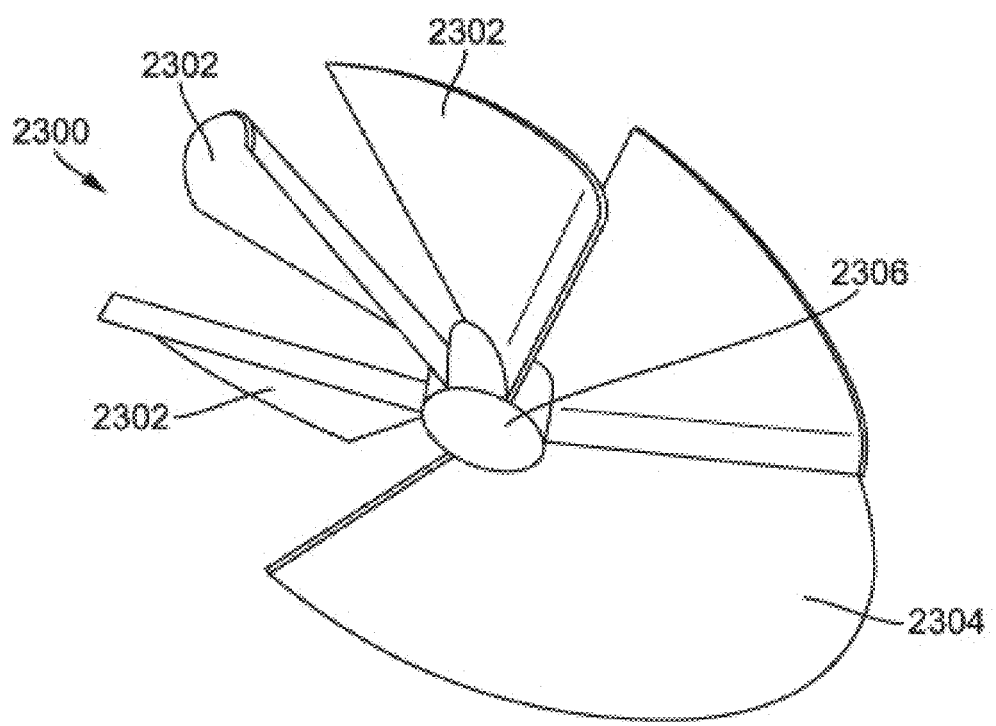
FIG. 8 is a bottom perspective view of yet another mixer for a vane swirl mixer.

FIG. 8 illustrates a curved vane mixer 2300 according to an example embodiment. It is understood that the curved vane mixer 2300 as shown and described with reference to FIG. 8 may be included in any of the embodiments of the vane swirl mixer 200 discussed herein.

In various embodiments, the curved vane mixer 2300 is utilized in the first flow device 206 in place of the upstream mixer 1106 or in place of the downstream mixer 309.

The curved vane mixer 2300 includes a plurality of curved vanes 2302 and a combined curved vane 2304. In some embodiments, the curved vane mixer 2300 includes two, three, four, five, six, seven, eight, or more of the curved vanes 2302. In some embodiments, the curved vane mixer 2300 includes one, two, three or more of the combined curved vanes 2304. In other embodiments, the curved vane mixer 2300 does not include the combined curved vane 2304. In an example embodiment, the curved vane mixer 2300 includes three of the curved vanes 2302 and one combined curved vane 2304.

Each of the curved vanes 2302 and the combined curved vane 2304 is attached to a curved vane hub 2306 that is offset from the mixer center axis by $HU_{offset}$, as detailed above. The curved vanes 2302 and/or the combined curved vane 2304 may be arranged symmetrically or asymmetrically about the curved vane hub 2306. Like the conduit straight vanes 2202, each of the curved vanes 2302 and the combined curved vane 2304 may overlap. Each of the curved vanes 2302 and the combined curved vane 2304 extend over an adjacent curved vane 2302 or combined curved vane 2304 the extension distance $E_{sw}$ described herein.

The curved vanes 2302 and the combined curved vane 2304 have a curved or aerodynamic shape which reduces pressure drop of the exhaust gases and facilitates more even distribution of the flow downstream of the curved vane mixer 2300, such as along a center axis of the curved vane mixer 2300.

Each of the curved vanes 2302 is defined by a curved vane angle $\alpha_{CV}$ relative to a curved vane hub center axis of the curved vane hub 2306. Similarly, the combined curved vane 2304 may be defined by the curved vane angle $\alpha_{CV}$ relative to a curved vane hub center axis of the curved vane hub 2306. Due to the curved nature of the curved vanes 2302 and the combined curved vane 2304, the curved vane angle $\alpha_{CV}$ is variable. The curved vane angle for each of the curved vanes 2302 and combined curved vanes 2304 may be different from the curved vane angle $\alpha_{CV}$ for the others of the curved vanes 2302 and the others of the combined curved vanes 2304.

The curved vanes 2302 and/or the combined curved vane 2304 may be constructed using casting and/or 3D printing. For example, the curved vane mixer 2300 may be printed using a 3D printer by using a file which specifies the number of the curved vanes 2302, the number of the combined curved vanes 2304, and the curved vane angle $\alpha_{CV}$ for each of the curved vanes 2302 and the combined curved vanes 2304. In various embodiments, the curved vanes 2302 and/or the combined curved vane 2304 can be design to keep a tangential angle constant at each point along the curved vane 2302 or combined curved vane 2304, or to minimize an aerodynamic drag force on each curved vane 2302 or combined curved vane 2304. In one embodiment, 3D printed or cast curved vanes 2303 may be inserted into the Venturi body 302 and welded to the first support flange 304.

Figure 9:
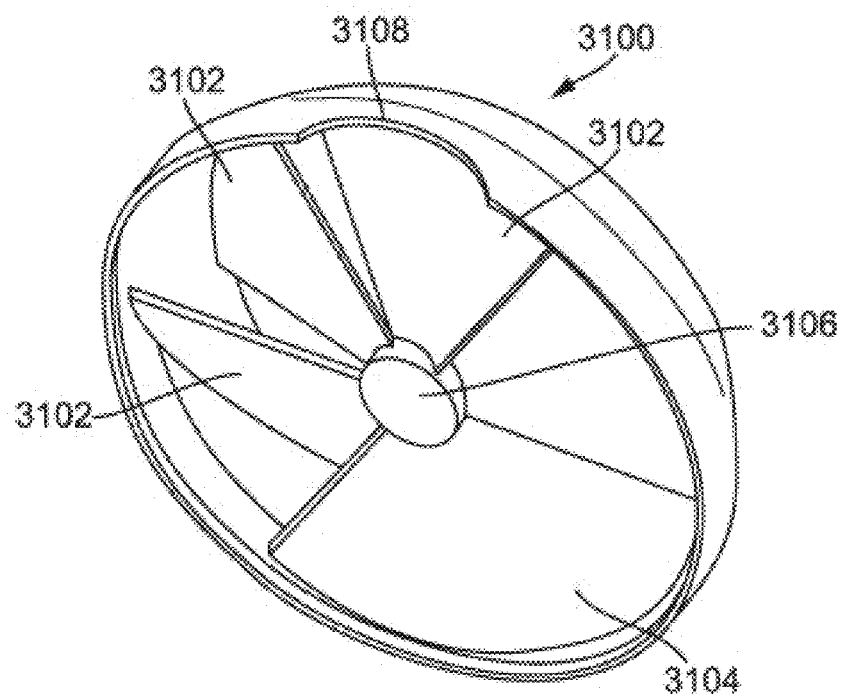
FIG. 9 is a top perspective view of yet another mixer for a vane swirl mixer.
Figure 10:
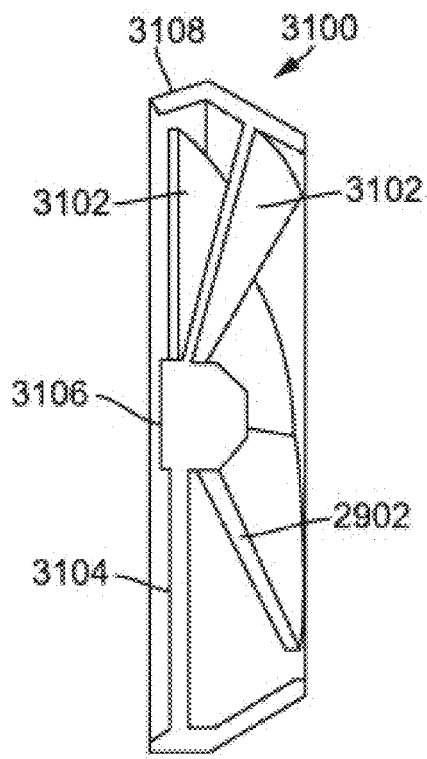
FIG. 10 is a side cross-sectional view of the mixer shown in FIG. 9.

FIGS. 9 and 10 illustrate a shrouded vane mixer 3100 according to an example embodiment. It is understood that the shrouded vane mixer 3100 as shown and described with reference to FIGS. 9 and 10 may be included in any of the embodiments of the multi-stage mixer 200 discussed herein.

FIG. 10 is a cross-sectional view of the shrouded vane mixer 3100. In various embodiments, the shrouded vane mixer 3100 is utilized in the first flow device 206 in place of the upstream mixer 1106 or in place of the downstream mixer 309.

The shrouded vane mixer 3100 includes a plurality of shrouded vanes 3102 and a combined shrouded vane 3104. In some embodiments, the shrouded vane mixer 3100 includes two, three, four, five, six, seven, eight, or more of the shrouded vanes 3102. In some embodiments, the shrouded vane mixer 3100 includes one, two, three or more of the combined shrouded vanes 3104. In other embodiments, the shrouded vane mixer 3100 does not include the combined shrouded vane 3104. In an example embodiment, the shrouded vane mixer 3100 includes three of the shrouded vanes 3102 and one combined shrouded vane 3104.

Each of the shrouded vanes 3102 and the combined shrouded vane 3104 is attached to a shrouded vane hub 3106 that is offset from the center axis of the vane swirl mixer by $HU_{offset}$, as detailed above. The shrouded vanes 3102 and/or the combined shrouded vane 3104 may be arranged symmetrically or asymmetrically about the shrouded vane central hub 3106. Like the conduit straight vanes 2202, each of the shrouded vanes 3102 and the combined shrouded vane 3104 may overlap.

The shrouded vane mixer 3100 includes a recess 2908. The recess 2908 is configured to fit around the exhaust gas guide aperture 306 when the shrouded vane mixer 3100 is installed in the vane swirl mixer 200.

The shrouded vane mixer 3100 combines the functions of a mixer (e.g., the upstream mixer 1106, the downstream mixer 309, etc.) with the functions of a shroud (e.g., the shroud 1308, etc.) in a single component. In this way, the shrouded vane mixer 3100 may reduce the cost (e.g., manufacturing cost, etc.) and manufacturing complexity of the vane swirl mixer 200. Additionally, combining the mixer and the shroud in a single component, the shrouded vane mixer 3100, reduces manufacturing tolerances on vane angles of the shrouded vanes 3102, thereby reducing variability between different shrouded vane mixers 3100. The thickness of each of the shrouded vanes 3102 may be constant or variable throughout the shrouded vane 3102, such as vertically along the shrouded vane 3102 or horizontally along the shrouded vane 3102. In various embodiments, the shrouded vane 3102 has a thickness of between 1.5 mm and 6 mm, inclusive. Similarly, in various embodiments, the edges of each of the shrouded vanes 3102 have a radius of between 0.5 mm and 3 mm, inclusive. This radius may reduce flow separation of the exhaust gases, mitigate accumulation of reductant deposits, and reduce stress concentrations on the shrouded vanes 3102 and/or the shroud 1318.

Figure 11:
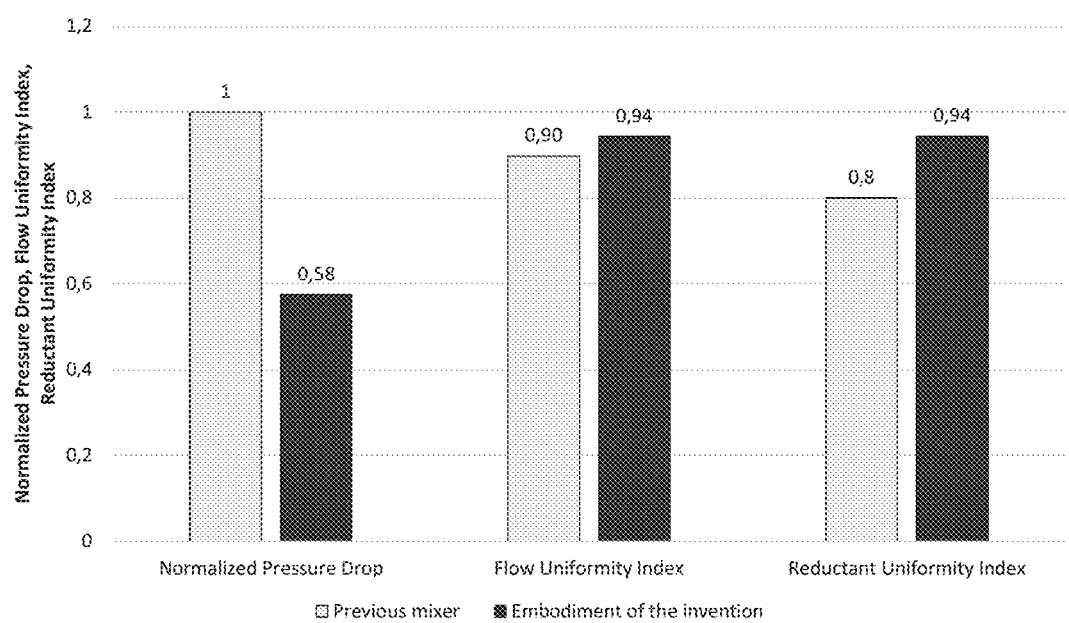
FIG. 11 is a diagram showing the results of comparing a previous mixer with an embodiment of a vane swirl mixer according to the invention.

FIG. 11 illustrates a comparison, determined via computational fluid dynamics (CFD) calculations, of the normalized pressure drop, the flow uniformity index and the reductant uniformity index of the vane swirl mixer according to the embodiment shown in FIGS. 2 to 4 and described above and a previous design of a vane swirl mixer as detailed in WO 2018/226626 A1, wherein the mixer lengths for both variants are the same. As can be seen the improved design with angle blades that differ in length and/or angle leads to an improvement of the uniformity of the exhaust flow and the reductant at the catalyst inlet downstream of the mixer, as well as a reduction of the pressure drop at the exhaust gas guide aperture. A reduced pressure drop correlates with a reduced exhaust swirl velocity which is beneficial to reduce the possibility of erosion of the catalyst. It is further possible to include additional flow devices downstream of the vane swirl mixer and upstream of the flow-through or wall-flow catalyst to further improve the flow distribution. These flow devices may be perforated plates or similar devices with predefined open areas.

IV. CONSTRUCTION OF EXAMPLE EMBODIMENTS

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid, such as exhaust, water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another. As described herein, "preventing" should be interpreted as potentially allowing for de minimus circumvention (e.g., less than 1%) of the exhaust gases.

It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

The invention claimed is:

1. A vane swirl mixer for exhaust aftertreatment, the vane swirl mixer being centered on a mixer center axis, the vane swirl mixer comprising:
    a vane swirl mixer inlet configured to receive exhaust gas;
    a vane swirl mixer outlet configured to provide the exhaust gas to a catalyst;
    a first flow device configured to receive the exhaust gas from the vane swirl mixer inlet and to receive a reductant such that the reductant is mixed with the exhaust gas within the first flow device, the first flow device comprising:
        a Venturi body defined by a body inlet and a body outlet, the Venturi body having a Venturi center axis;
        a plurality of upstream vanes positioned within the Venturi body and proximate the body inlet, wherein each of the upstream vanes is coupled to an upstream vane hub;
        a plurality of upstream vane apertures interspaced between the plurality of upstream vanes, the plurality of upstream vane apertures being configured to receive the exhaust gas and to cooperate with the plurality of upstream vanes to provide the exhaust gas with a swirl flow that facilitates mixing of the reductant and the exhaust gas;
        a plurality of downstream vanes positioned within the Venturi body and proximate the body outlet, wherein each of the downstream vanes is coupled to a downstream vane hub; and
        a plurality of downstream vane apertures interspaced between the plurality of downstream vanes, the plurality of downstream vane apertures configured to receive the exhaust gas and to cooperate with the plurality of downstream vanes to facilitate further mixing of the reductant and the exhaust gas; and
    wherein at least one of the upstream vane hub and the downstream vane hub is radially offset from the Venturi center axis, thereby causing individual ones of the plurality of vanes coupled to the radially offset vane hub to differ in their geometry.

2. The vane swirl mixer of claim 1, wherein the downstream vane hub is centered on the Venturi center axis.

3. The vane swirl mixer of claim 2, wherein
    each of the plurality of downstream vanes is defined by a downstream vane angle between a downstream vane hub center axis of the downstream vane hub and the plane of the downstream vane, the downstream vane hub center axis being parallel to the Venturi center axis; and
    the downstream vane angle for each of the plurality of downstream vanes is between forty-five degrees and ninety degrees, inclusive.

4. The vane swirl mixer of claim 3, wherein
    the downstream vane angle for one of the plurality of downstream vanes differs from the downstream vane angle for another of the plurality of downstream vanes.

5. The vane swirl mixer of claim 1, wherein
    each of the plurality of upstream vanes is defined by an upstream vane angle between an upstream vane hub center axis of the upstream vane hub and the plane of the upstream vane, the upstream vane hub center axis being parallel to the Venturi center axis; and
    the upstream vane angle for each of the plurality of upstream vanes is between forty-five degrees and ninety degrees, inclusive.

6. The vane swirl mixer of claim 5, wherein
    the upstream vane angle for one of the plurality of upstream vanes differs from the upstream vane angle for another of the plurality of upstream vanes.

7. The vane swirl mixer of claim 1, wherein at least one of each of the plurality of upstream vanes and each of the plurality of downstream vanes is coupled to and conforms with the Venturi body such that each of the coupled and conforming vanes cooperates with the Venturi body to form a conduit.

8. The vane swirl mixer of claim 1, wherein
    at least one of the plurality of upstream vanes and the plurality of downstream vanes are conduit straight vanes, wherein
    adjacent conduit straight vanes form a conduit therebetween, the conduit having a streamwise direction defined by the angle bisector of the planes of the adjacent conduit straight vanes;
    a streamwise angle being defined between the streamwise direction and a hub center axis of the conduit straight vane hub, the hub center axis of the conduit straight vane hub being parallel to the Venturi center axis; and
    the streamwise angle for each of the plurality of conduit straight vanes being between thirty degrees and ninety degrees, inclusive.

9. The vane swirl mixer of claim 8,
    wherein the streamwise angle for one of the plurality of conduit straight vanes differs from the streamwise angle for another of the plurality of conduit straight vanes.

10. The vane swirl mixer of claim 8, wherein
    each of the plurality of conduit straight vanes is coupled to and conforms with the Venturi body such that each of the plurality of conduit straight vanes cooperates with the Venturi body to form a conduit.

11. The vane swirl mixer of claim 8, wherein
    one of the plurality of conduit straight vanes extends over another of the plurality of conduit straight vanes over an extension distance;
    the one of the plurality of conduit straight vanes has a width in the streamwise direction; and
    the extension distance is between zero and seventy-five percent, inclusive, of the width in the streamwise direction of the one of the plurality of conduit straight vanes.

12. The vane swirl mixer of claim 1, wherein
    the Venturi body comprises an exhaust gas guide aperture disposed along the Venturi body between the body inlet and the body outlet.

13. The vane swirl mixer of claim 12, wherein
    the exhaust gas guide aperture is one of circular and elliptical.

14. The vane swirl mixer of claim 1, further comprising a reductant doser for introducing the reductant into the vane swirl mixer along an axis.

15. The vane swirl mixer of claim 14 wherein
an angle (γ) between a reductant introduction axis and a circumferentially nearest radial edge of the vane will be between $$\pm \frac{360}{2n},$$

where n is the number of vanes.

16. The vane swirl mixer of claim 14, wherein
the doser is located about the exhaust gas guide aperture.

17. The vane swirl mixer of claim 16, wherein
the doser and the exhaust gas guide aperture are placed on a vertical mid-plane of the vane swirl mixer, directing the reductant towards the mixer center axis.

18. The vane swirl mixer of claim 16, wherein
the doser and the exhaust gas guide aperture are placed at an offset to a vertical mid-plane of the vane swirl mixer, directing the reductant towards the Venturi walls.

19. The vane swirl mixer of claim 1, wherein
the Venturi center axis is radially offset from the mixer center axis.

20. A diesel exhaust unit comprising a flow-through or wall-flow catalyst and a vane swirl mixer according to claim 1.

\* \* \* \* \*